US012108767B2

(12) United States Patent
Jung et al.

(10) Patent No.: US 12,108,767 B2
(45) Date of Patent: Oct. 8, 2024

(54) SPRING ROLL MAKING APPARATUS

(71) Applicants: DAEHAN FOOD MACHINE CO., LTD., Gimpo-si (KR); CJ CHEILJEDANG CORPORATION, Seoul (KR)

(72) Inventors: Byung Chun Jung, Gimpo-Si (KR); Jae Won Seong, Incheon (KR); Bong Jin Jang, Seoul (KR)

(73) Assignees: DAEHAN FOOD MACHINE CO., LTD., Gimpo-Si (KR); CJ CHEILJEDANG CORPORATION, Seoul (KR)

( * ) Notice: Subject to any disclaimer, the term of this patent is extended or adjusted under 35 U.S.C. 154(b) by 925 days.

(21) Appl. No.: 17/257,732

(22) PCT Filed: May 22, 2019

(86) PCT No.: PCT/KR2019/006120
§ 371 (c)(1),
(2) Date: Jan. 4, 2021

(87) PCT Pub. No.: WO2020/009326
PCT Pub. Date: Jan. 9, 2020

(65) Prior Publication Data
US 2021/0169089 A1 Jun. 10, 2021

(30) Foreign Application Priority Data

Jul. 4, 2018 (KR) .................. 10-2018-0077530
Jul. 4, 2018 (KR) .................. 10-2018-0077531
Jul. 4, 2018 (KR) .................. 10-2018-0077532

(51) Int. Cl.
*A21C 9/06* (2006.01)
*A21C 9/08* (2006.01)
(Continued)

(52) U.S. Cl.
CPC ............... *A21C 9/063* (2013.01); *A21C 9/08* (2013.01); *A21C 14/00* (2013.01); *A23P 20/20* (2016.08)

(58) Field of Classification Search
CPC ........... A21C 9/063; A21C 9/08; A21C 14/00; A23P 20/20
(Continued)

(56) References Cited

U.S. PATENT DOCUMENTS 4,187,968 A * 2/1980 Winterholler ........... B41F 13/03
226/97.1
4,371,076 A * 2/1983 Nakao ..................... B65B 35/54
198/418.2
(Continued)

FOREIGN PATENT DOCUMENTS

KR 20040028544 A 4/2004
KR 20050101008 A 10/2005
(Continued)

OTHER PUBLICATIONS

International Search Report issued in International Application No. PCT/KR2019/006120 dated Aug. 29, 2019 (2 pages).
(Continued)

Primary Examiner — Eric S Stapleton
Assistant Examiner — Yeong Juen Thong
(74) Attorney, Agent, or Firm — Osha Bergman Watanabe & Burton LLP

(57) ABSTRACT

The present invention relates to a spring roll making apparatus comprising: a supply part for supplying rice paper; a moving part for moving the rice paper supplied by means of the supply part; a softening part for inducing softening of the rice paper moving by means of the moving part; a feeding part for feeding a filling onto the rice paper softened by means of the softening part; a folder part for folding the rice
(Continued)

paper on which the filling is put; and a rotating part for rolling the rice paper folded by means of the folder part, and thus spring rolls can be mass-produced.

23 Claims, 25 Drawing Sheets

(51) Int. Cl.
  *A21C 14/00* (2006.01)
  *A23P 20/20* (2016.01)
(58) Field of Classification Search
  USPC .................................. 99/450.6, 450.7, 494
  See application file for complete search history.

(56) References Cited

U.S. PATENT DOCUMENTS

| | | | | |
|---|---|---|---|---|
| 5,505,970 | A * | 4/1996 | Morikawa | A21C 3/02 425/141 |
| 6,295,481 | B1 * | 9/2001 | Price | G05B 19/0425 112/470.07 |
| 6,468,195 | B1 * | 10/2002 | Jackson | B65H 45/22 493/443 |
| 2012/0152130 | A1 * | 6/2012 | Robert | A21C 9/063 99/450.7 |
| 2015/0010679 | A1 * | 1/2015 | Strong | A23L 3/06 99/468 |
| 2016/0316944 | A1 * | 11/2016 | Noh | A47G 19/02 |
| 2018/0153178 | A1 * | 6/2018 | Tokuhara | B26D 1/06 |
| 2020/0236985 | A1 * | 7/2020 | Itou | A21C 9/063 |
| 2021/0345624 | A1 * | 11/2021 | Itou | A23P 20/20 |

FOREIGN PATENT DOCUMENTS

| | | |
|---|---|---|
| KR | 20090040503 A | 4/2009 |
| KR | 20130128297 A | 11/2013 |
| KR | 101528560 B1 | 6/2015 |
| KR | 101733389 B1 | 5/2017 |

OTHER PUBLICATIONS

Written Opinion issued in International Application No. PCT/KR2019/006120 dated Aug. 29, 2019 (5 pages).

* cited by examiner

SPRING ROLL MAKING APPARATUS

TECHNICAL FIELD

The present invention relates to a spring roll making apparatus, and more particularly, to a spring roll making apparatus which allows a large quantity of spring rolls to be rapidly produced through an automated process.

BACKGROUND ART

Generally, spring rolls are food which is made of wheat flour or rice flour, like a pancake, and stuffed with filling and fried. Such a spring roll is called "Chūn Juǎn" in China, "Cha Zio" in Vietnam, and "Harumaki" in Japan.

The "Chūn Juǎn" is a type of dumpling. Wheat flour, starch powder, eggs, and the like are mixed to look like a pancake, and then the pancake is stuffed with filling that is made by mixing vegetables such as shiitake mushrooms, bean sprouts, and bamboo shoots, minced pork, shrimp, or the like, rolled up, and fried in oil.

The "Cha Zio" is a food made by putting minced pork, shrimp meat, and vegetables such as carrots, green peppers, mushrooms, and the like on a Vietnamese spring roll called a rice paper, rolled up, and being fried in oil. To make the "Cha Zio," the Vietnamese spring roll is placed as a rhombus shape, filling is placed a little below the center of the spring roll, a front part of the spring roll is folded first and both wing parts are folded inward, and the Vietnamese spring roll is rolled and fried in oil.

However, conventionally, since it is difficult to automate a process of making spring rolls such as "Cha Zio" so that the spring rolls are manually produced, there is a problem in that the production amount cannot be increased. Therefore, there is a need to solve the above problem.

The background technology of the present invention is disclosed in Korean Unexamined Patent Application Publication No. 2004-0028544 (Published on Apr. 3, 2004, Title: SPRING ROLL AND METHOD OF MANUFACTURING THE SAME).

DISCLOSURE

Technical Problem

The present invention is directed to providing a spring roll making apparatus which allows a large quantity of spring rolls to be rapidly produced through an automated process.

Technical Solution

One aspect of the present invention provides a spring roll making apparatus including a supply part configured to supply a rice paper, a moving part configured to move the rice paper supplied by the supply part, a softening part configured to induce softening of the rice paper moved by the moving part, a feeding part configured to feed a filling onto the rice paper softened by the softening part, a folding part configured to fold the rice paper on which the filling is placed, and a rotating part configured to roll the rice paper folded by the folding part.

The softening part may include a softening spray part configured to spray hot water onto the rice paper moved by the moving part.

The softening part may further include a softening steam part configured to supply steam onto the rice paper.

The softening steam part may include a plurality of steam stands, a steam tank part which is supported by the steam stands, covers the moving part, and stores water, and a steam heating part which is mounted on the steam tank part and heats the stored water.

The softening steam part may further include a steam circulation part which is mounted on the steam tank part and circulates the steam.

The feeding part may include a feed supply part configured to supply the filling, and a feed cutting part configured to cut and subdivide the filling provided from the feed supply part.

The feed supply part may include a supply inlet part into which the filling is introduced, a supply guide part which is connected to the supply inlet part and guides the filling, and a supply operation part which is inserted into the supply guide part and provides the filling introduced into the supply guide part to an end part of the supply guide part.

A guide hole formed in the end part of the supply guide part may have an angular shape so that the filling is provided in the angular shape.

The feed cutting part may include a cutting driver of which a vertical length is varied, a cutting link part rotatably mounted on the cutting driver and having a height adjusted according to a length of the cutting driver, a cutting blade part which is formed on the cutting link part and cuts the filling, and a cutting rotation part which is connected to the cutting link part and of which a length is varied to rotate the cutting link part.

The feeding part may further include a feed belt part configured to guide the filling that is subdivided, a feed stopper configured to stop movement of the filling being moved by the feed belt part, and a feed dropping part configured to drop the filling of which the movement is stopped by the feed stopper from the feed belt part.

The feed stopper may include a stopper head which is brought into contact with the filling, and a stopper variable part which is connected to the stopper head and of which a length is varied to move the stopper head.

The stopper variable part may move the stopper head so that the stopper head is spaced apart from the filling when the feed dropping part pushes the filling stopped by the stopper head.

The feed dropping part may include a drop rod disposed above the feed stopper, a drop operation part mounted on the drop rod, and a drop plate which is connected to the drop operation part and pushes the filling while being rotated by the drop operation part.

The folding part may include a first folding part configured to allow a front end part of the rice paper to be wrapped around the placed filling, a second folding part configured to press the rice paper which passes through the first folding part and is placed on both sides of the filling, and a third folding part configured to fold the rice paper which passes through the second folding part and is placed on the both sides of the filling.

The first folding part may include a first spray part configured to spray air onto an end part of the rice paper and allow the rice paper to be wrapped around the filling, and a first engaging part configured to allow the rice paper wrapped around the filling to be caught and rotated several times.

The first engaging part may include a first engaging support part provided on the moving part, and a first engaging contact part which is rotatably mounted on the first engaging support part and is brought into contact with the rice paper wrapped around the filling.

The second folding part may include a second support part, a second rod rotatably mounted on the second support part, and second rotating plates which are provided in a pair to be rotatably mounted on an end part of the second rod and presses the rice paper placed on the both sides of the filling.

The second folding part may further include a second variable part which is coupled to the second rod and of which a length is varied to rotate the second rod.

The second folding part may include the second motor driver, and a second motor rotating part which is mounted on the second motor driver and rotated when power is applied to the second motor driver. The second motor rotating part may include a second motor rotation shaft which is coupled to the second motor driver and rotated when the second motor driver is driven, and second motor rotation contact parts which are formed on the second motor rotation shaft and provided in a pair to face each other.

The third folding part may include a third central pressing part configured to press the filling wrapped in the rice paper, a third left-and-right pressing part configured to press a left wing and a right wing of the rice paper alternately, a third left spray part configured to spray air onto a left end part of the rice paper, and a third right spray part configured to spray air onto a right end part of the rice paper.

The third central pressing part may include a third pressing driver which is disposed above the moving rice paper and moved in a traveling direction of the rice paper, and a third pressing contact part which is mounted on the third pressing driver and presses the filling wrapped in the rice paper while being moved in the traveling direction of the rice paper.

The third left-and-right pressing part may include a left-and-right support part disposed above the moving rice paper, a left pressing part which is rotatably mounted on the left-and-right support part and presses the left wing of the rice paper, and a right pressing part which is rotatably mounted on the left-and-right support part and presses the right wing of the rice paper. The right pressing part may be disposed in front of the left pressing part.

The third left-and-right pressing part may include a third left-and-right operation part which is disposed above the moving rice paper and of which a length is varied, a third left-and-right rod mounted on the third left-and-right operation part and having a height adjusted when the third left-and-right operation part is operated, and a third left-and-right pressing part which is mounted on the third left-and-right rod and presses the left and right wings of the rice paper.

The folding part may further include a fourth folding part configured to fold a protruding part of the rice paper passing through the third folding part.

The fourth folding part may include a fourth pressing part configured to press an end part of the rice paper, and a fourth spray part configured to spray air onto the rice paper and fold a side end part of the rice paper.

The rotating part may include a rotation support part mounted on the moving part and disposed above the rice paper, and a rotation guide part which is mounted on the rotation support part, has a length in a traveling direction of the rice paper, and allows the rice paper to be caught and rolled.

Advantageous Effects

According to a spring roll making apparatus according to the present invention, a large quantity of spring rolls can be rapidly produced through an automated process, manufacturing costs can be reduced due to the mass production, and uniform quality can be maintained.

MODES OF THE INVENTION

Figure 1:
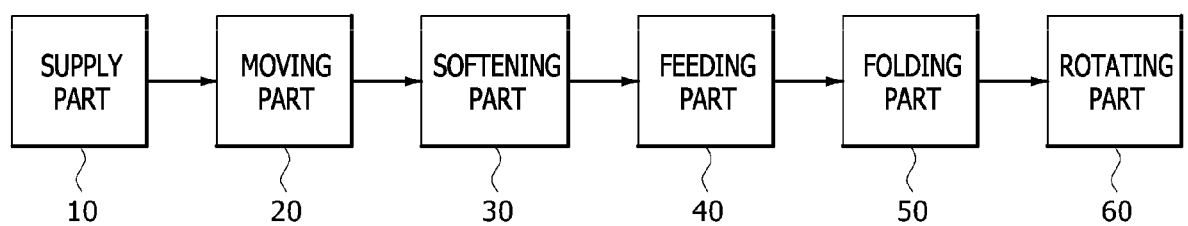
FIG. 1 is a schematic block diagram illustrating a spring roll making apparatus according to an embodiment of the present invention.

Hereinafter, embodiments of a spring roll making apparatus according to the present invention will be described with reference to the accompanying drawings. In this process, thicknesses of lines, sizes of components, and the like illustrated in the drawings may be exaggerated for clarity and convenience of description. In addition, some terms which will be described below are defined in consideration of functions in the present invention and meanings may vary depending on, for example, a user or operator's intentions or customs. Therefore, the meanings of these terms should be interpreted based on the scope throughout this specification.

Figure 2:
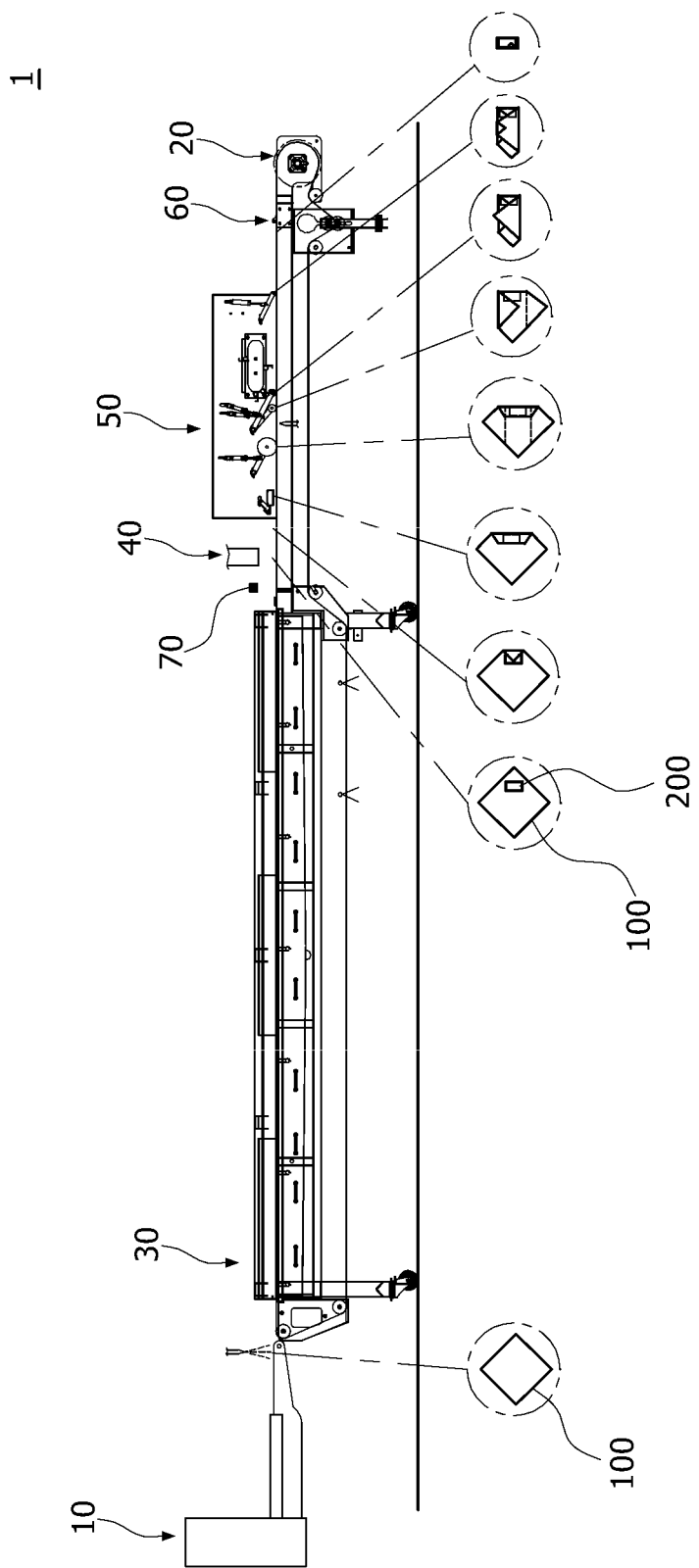
FIG. 2 is a schematic view illustrating the spring roll making apparatus according to the embodiment of the present invention.

FIG. 1 is a schematic block diagram illustrating a spring roll making apparatus according to an embodiment of the present invention, and FIG. 2 is a schematic view illustrating the spring roll making apparatus according to the embodiment of the present invention. Referring to FIGS. 1 and 2, a spring roll making apparatus 1 according to the embodiment of the present invention includes a supply part 10, a moving part 20, a softening part 30, a feeding part 40, a folding part 50, and a rotating part 60.

The supply part 10 supplies rice papers 100. For example, the supply part 10 may supply the dried rice papers 100 one by one, and the supplied rice papers 100 may be moved as a rhombus shape. The supply part 10 may move the rice papers 100 in a chain conveyor method.

The moving part 20 moves the rice paper 100 supplied by the supply part 10. For example, the moving part 20 may be disposed adjacent to a chain conveyor of the supply part 10 and may move the rice paper 100 in a belt conveyor method. In this case, a plurality of holes may be formed in a belt to allow fluid to pass therethrough. Meanwhile, while the rice paper 100 is continuously moved by the moving part 20, the softening part 30, the feeding part 40, the folding part 50, and the rotating part 60 may be sequentially operated so that a spring roll may be made.

The softening part 30 induces softening of the rice paper 100 moved by the moving part 20. For example, the softening part 30 may supply moisture to the dried rice paper 100 so that the rice paper 100 may be smoothly folded.

The feeding part 40 feeds a filling 200 onto the rice paper 100 softened by the softening part 30. For example, while the softened rice paper 100 is moved by the moving part 20, the feeding part 40 may place a predetermined amount of the filling 200 on the rice paper 100. In this case, when the sensor part 70 detects the rice paper 100, the feeding part 40 may be driven to place the filling 200 on a front end part of the rice paper 100.

The folding part 50 folds the rice paper 100 on which the filling 200 is placed. For example, the folding part 50 may allow two side wings of the filling 200 to be overlapped and stacked above the filling 200.

The rotating part 60 rolls the rice paper 100 folded by the folding part 50. The rotating part 60 rotates the rice paper 100 wrapped around the filling 200 so that a rear end part of the rice paper 100 may be wrapped around the filling 200.

Figure 3:
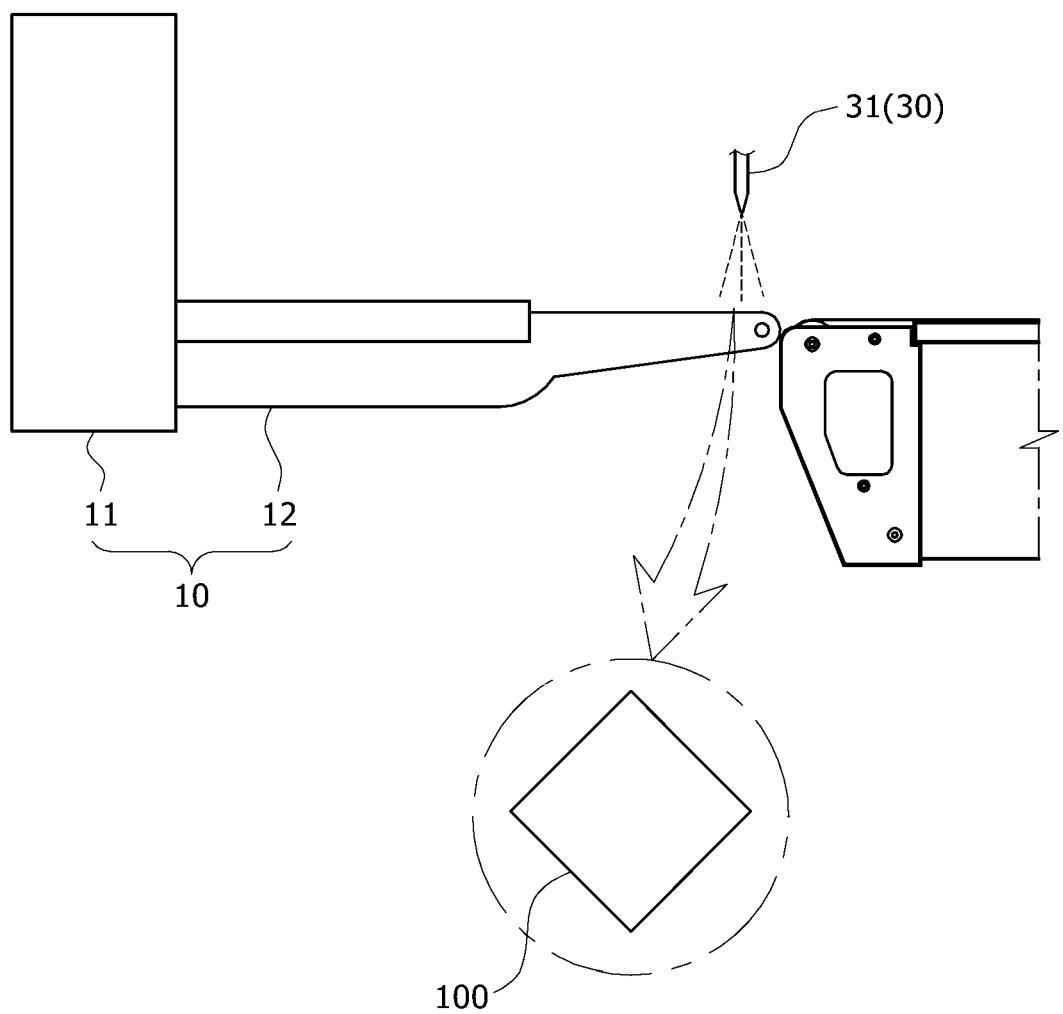
FIG. 3 is a schematic view illustrating a softening part in the spring roll making apparatus according to the embodiment of the present invention.

FIG. 3 is a schematic view illustrating the softening part in the spring roll making apparatus according to the embodiment of the present invention. Referring to FIG. 3, the softening part 30 according to the embodiment of the present invention includes a softening spray part 31. The softening spray part 31 sprays hot water onto the rice paper 100 that is moved by the supply part 10. For example, the supply part 10 may include a first supply part 11 which provides the rice papers 100 one by one, and a second supply part 12 which is operated in a chain conveyor method to guide the provided rice papers 100 to the moving part 20. In addition, the softening spray part 31 may be disposed above the second supply part 12 to spray hot water onto the rice paper 100.

Figure 4:
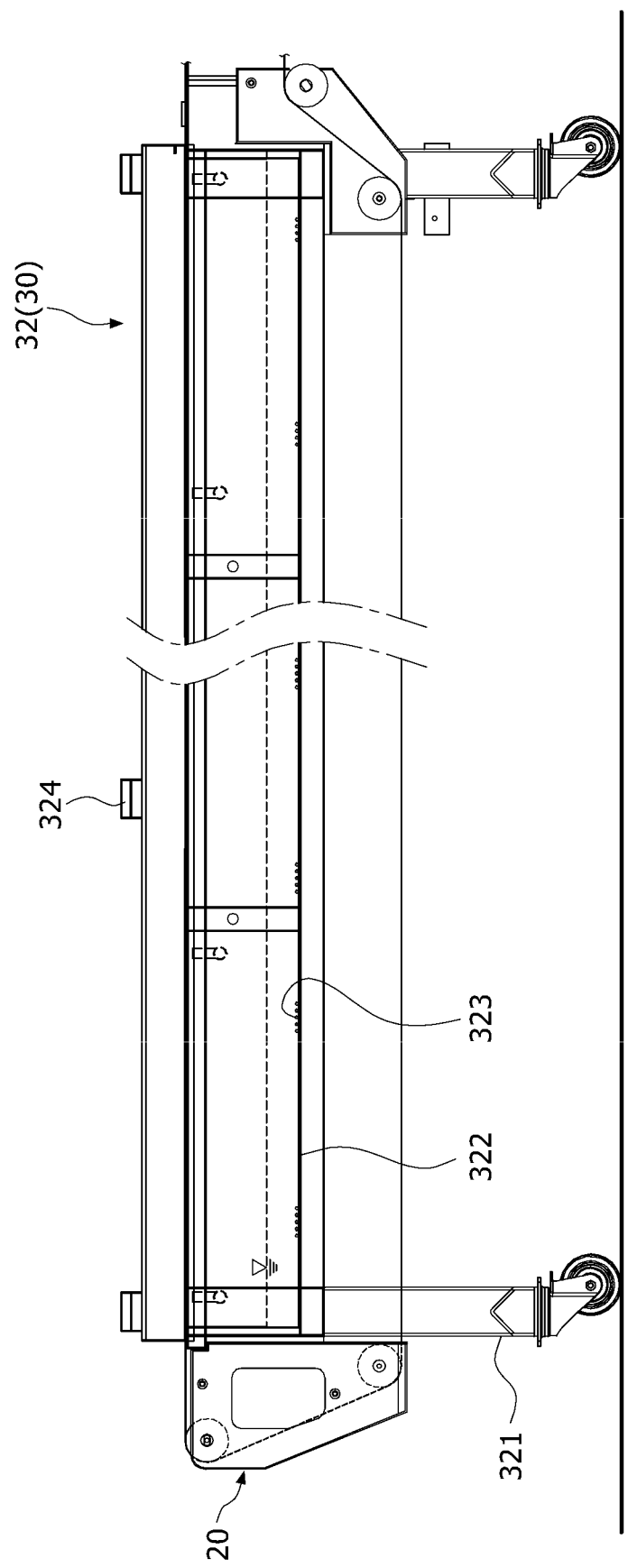
FIG. 4 is a schematic view illustrating a softening steam part in the spring roll making apparatus according to the embodiment of the present invention.

FIG. 4 is a schematic view illustrating a softening steam part in the spring roll making apparatus according to the embodiment of the present invention. Referring to FIG. 4, the softening part 30 according to the embodiment of the present invention may further include a softening steam part 32 which supplies steam onto the rice paper 100. That is, moisture may first be supplied to an upper surface of the rice paper 100 by the softening spray part 31, and the moisture may be supplied to an entire surface of the rice paper 100 through the steam so that the rice paper 100 may be rapidly softened.

The softening steam part 32 according to the embodiment of the present invention includes steam stands 321, a steam tank part 322, and a steam heating part 323. The softening steam part 32 may cover a part of the moving part 20 to supply the steam to the rice paper 100 that is moved to the moving part 20.

The plurality of steam stands 321 support the steam tank part 322 in which water is stored. For example, four steam stands 321 may be fixed to the ground and may be moved to a destination by rolling separate wheels thereof.

The steam tank part 322 covers the moving part 20. For example, a belt conveyor of the moving part 20 may pass through an inside of the steam tank part 322, and water may be stored under the belt of the moving part 20.

The steam heating part 323 is mounted on the steam tank part 322 and heats the stored water. For example, the steam heating part 323 may be a coil that heats water when power is applied. The steam heating part 323 may be provided with a plurality of heating parts 323 disposed in a longitudinal direction of the steam tank part 322.

The softening steam part 32 according to the embodiment of the present invention may further include a steam circulation part 324. The steam circulation part 324 is mounted on the steam tank part 322 and circulates the steam. For example, the steam circulation part 324 may be mounted above the steam tank part 322, and a blade may be rotated to induce circulation of the steam. The steam circulation part 324 may be provided with a plurality of circulation parts 324 mounted in the longitudinal direction of the steam tank part 322.

Figure 5:
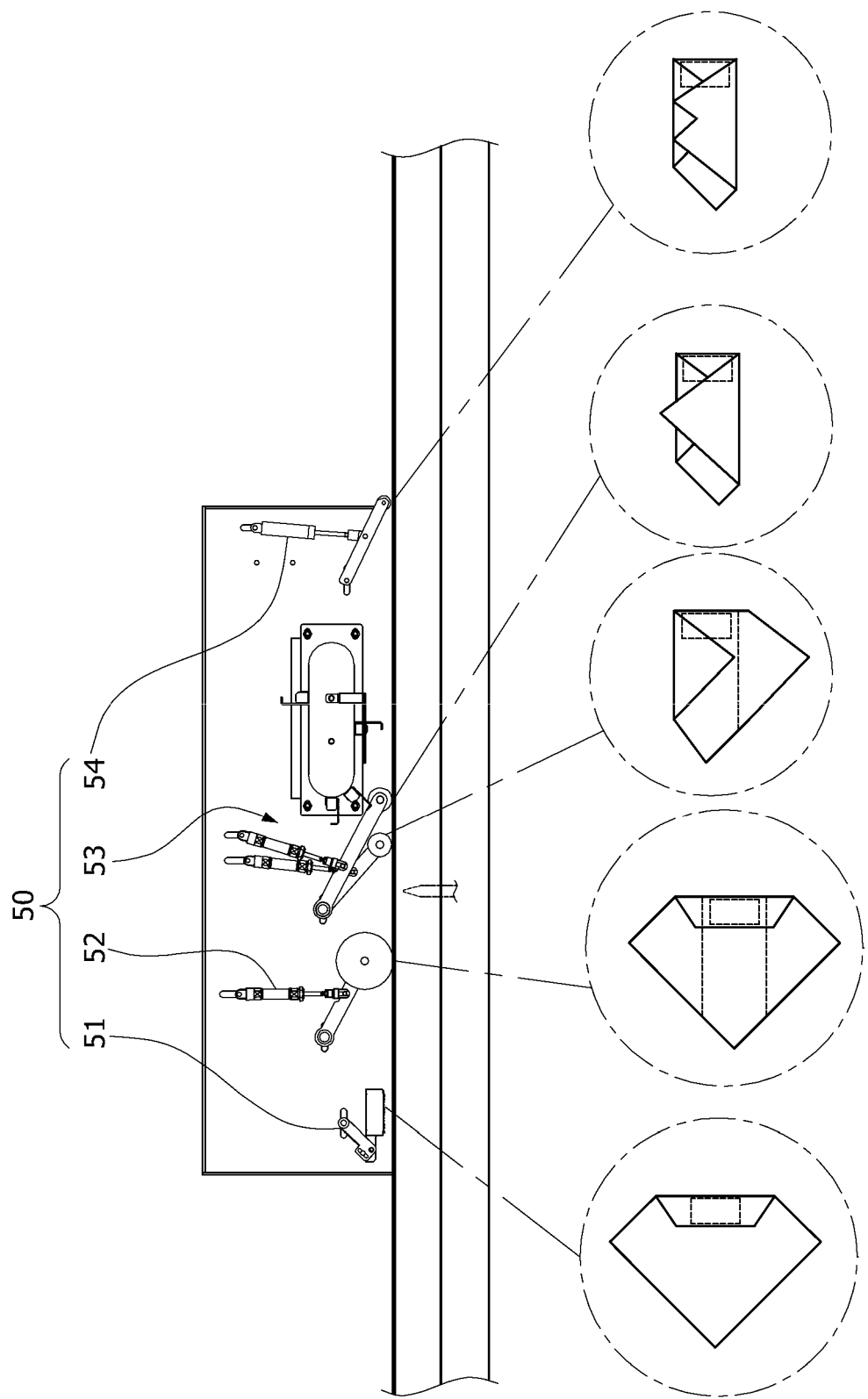
FIG. 5 is a schematic view illustrating a folding part in the spring roll making apparatus according to the embodiment of the present invention.

FIG. 5 is a schematic view illustrating the folding part in the spring roll making apparatus according to the embodiment of the present invention. Referring to FIG. 5, the folding part 50 according to the embodiment of the present invention includes a first folding part 51, a second folding part 52, and a third folding part 53.

The first folding part 51 allows the front end part of the rice paper 100 to be wrapped around the filling 200 placed thereon. For example, by the first folding part 51, the front end part of the rice paper 100 may be wrapped around the filling 200.

The second folding part 52 presses the rice paper 100 that passes through the first folding part 51 and is placed on both sides of the filling 200. For example, the second folding part 52 may press the rice paper 100 placed on the both sides of the filling 200 to prevent the rice paper 100 from being lifted and to allow the rice paper 100 to be folded later.

The third folding part 53 folds the rice paper 100 that passes through the second folding part 52 and is placed on the both sides of the filling 200. For example, the third folding part 53 may allow the rice paper 100 placed on the both sides of the filling 200 to be folded alternately.

The folding part 50 according to the embodiment of the present invention may further include a fourth folding part 54. The fourth folding part 54 folds a protruding part of the rice paper 100 that passes through the third folding part 53. For example, left and right sides of the rice paper 100 are alternately folded by the third folding part 53 so that the part folded later may protrude to have a length greater than a length of the filling 200, and the protruding part may be corrected by the fourth folding part 54.

Figure 6:
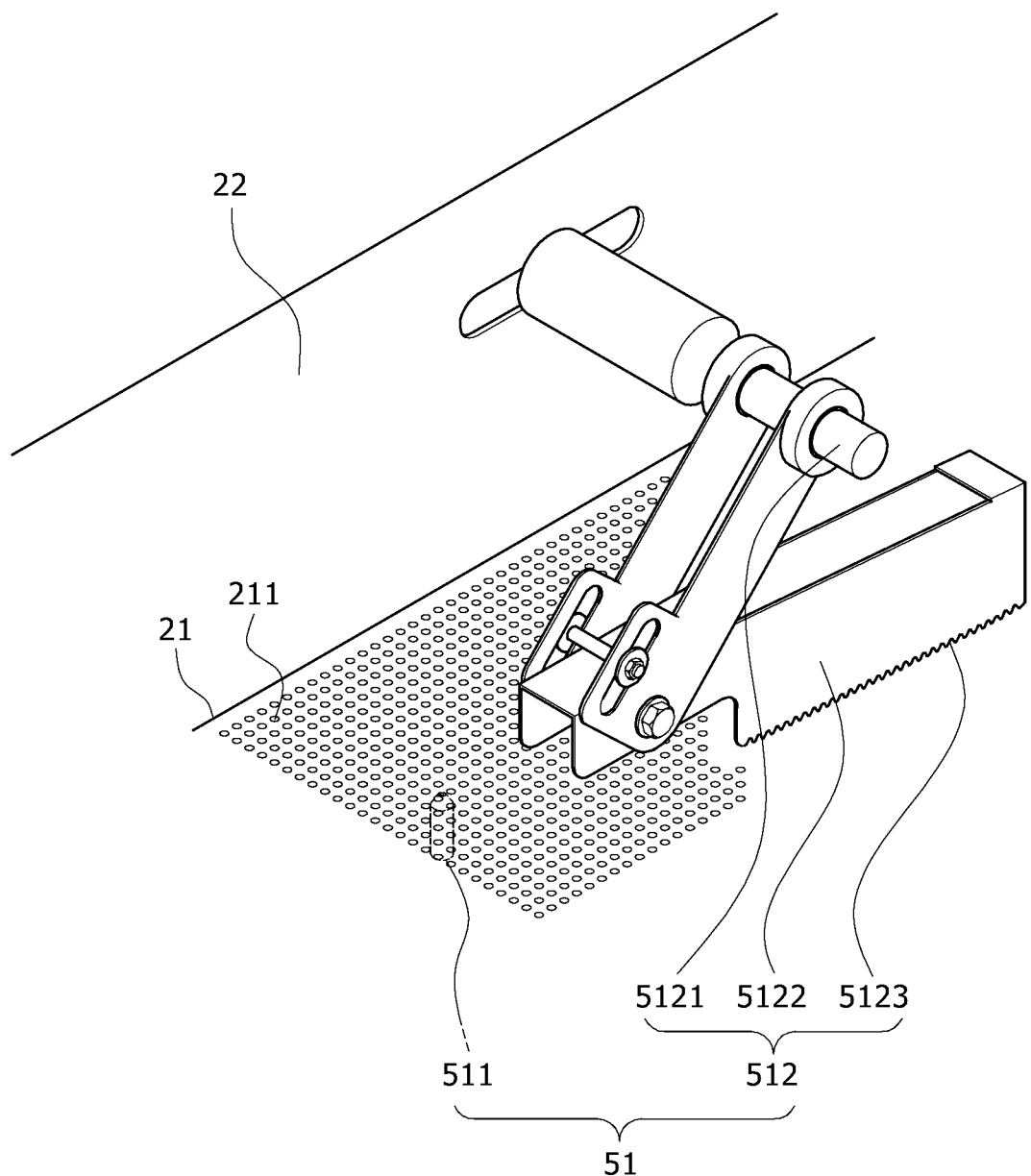
FIG. 6 is a schematic view illustrating a first folding part in the spring roll making apparatus according to the embodiment of the present invention.

FIG. 6 is a schematic view illustrating the first folding part in the spring roll making apparatus according to the embodiment of the present invention. Referring to FIG. 6, the first folding part 51 according to the embodiment of the present invention includes a first spray part 511 and a first engaging part 512.

The first spray part 511 sprays air onto the front end part of the rice paper 100 and allows the rice paper 100 to be wrapped around the filling 200. For example, the first spray part 511 may be mounted on the moving part 20 and disposed below the belt part 21 that is moved in a caterpillar manner. When the first spray part 511 sprays air, the front end part of the rice paper 100 may be flipped by belt holes 211 formed in the belt part 21. Accordingly, the front end part of the rice paper 100 may be wrapped around the filling 200.

The first engaging part 512 allows the rice paper 100 that is moved by the moving part 20 to be caught and rotated several times. For example, the first engaging part 512 may include a first engaging support part 5121, which is fixedly provided on the moving part 20, and a first engaging contact part 5122 which is rotatably mounted on the first engaging support part 5121 and which is brought into contact with the rice paper 100 that is moved by being wrapped around the filling 200. Accordingly, even when the rice paper 100 is wrapped around only an upper end part of the filling 200 by the first spray part 511, the filling 200 may be rotated by the first engaging part 512 so that the rice paper 100 may be stably wrapped around the filling 200. In this case, a plurality of first engaging contact protrusions 5123 may be formed in a longitudinal direction of the first engaging contact part 5122 to induce smooth contact and friction with the rice paper 100 wrapped around the filling 200. Meanwhile, the first engaging support part 5121 may be mounted on a movement fixing part 22 fixedly provided on the moving part 20 and disposed above the belt part 2.

Figure 7:
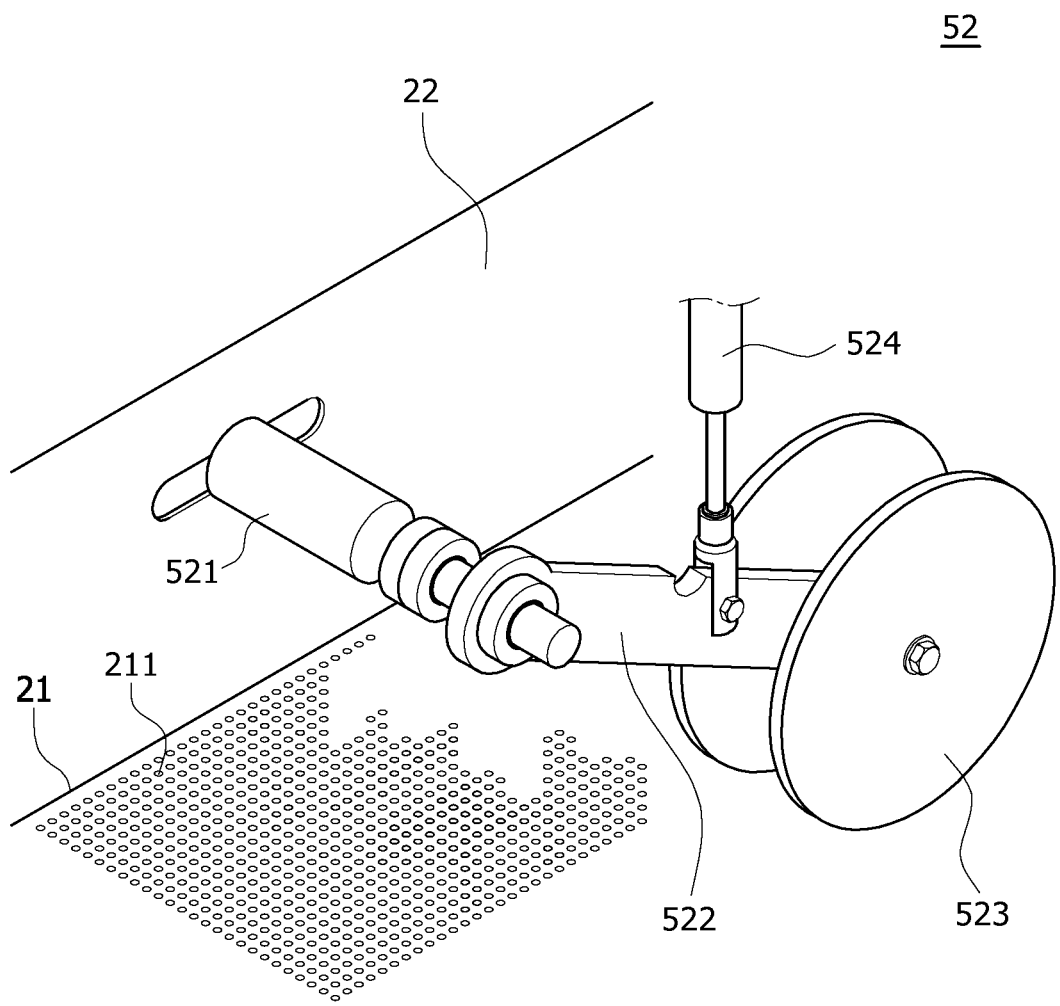
FIG. 7 is a schematic view illustrating a second folding part in the spring roll making apparatus according to the embodiment of the present invention.

FIG. 7 is a schematic view illustrating the second folding part in the spring roll making apparatus according to the embodiment of the present invention. Referring to FIG. 7, the second folding part 52 according to the embodiment of the present invention may include a second support part 521, a second rod 522, and second rotating plates 523.

The second support part 521 is fixedly provided on the movement fixing part 22 and disposed above the belt part 21. The second rod 522 is rotatably mounted on the second support part 521. The second rotating plates 523 are provided in a pair to be mounted rotatably on an end part of the second rod 522 and presses the rice paper 100 placed on the both sides of the filling 200.

For example, each of the second rotating plates 523 may be rotatably mounted on one of two sides of the second rod 522. In this case, a distance between the second rotating plates 523 may be greater than the length of the filling 200. Accordingly, the second rotating plates 523 may form boundary lines for folding by pressing the rice paper 100 located at the both side end parts of the filling 200.

Meanwhile, a second variable part 524 mounted on the movement fixing part 22 may be coupled to the second rod 522, and a length thereof may be varied to rotate the second rod 522. That is, when the sensor part 70 detects the rice paper 100, the length of the second variable part 524 may be increased and thus the second rotating plates 523 disposed above the belt part 21 may be brought into contact with the belt part 21.

Figure 8:
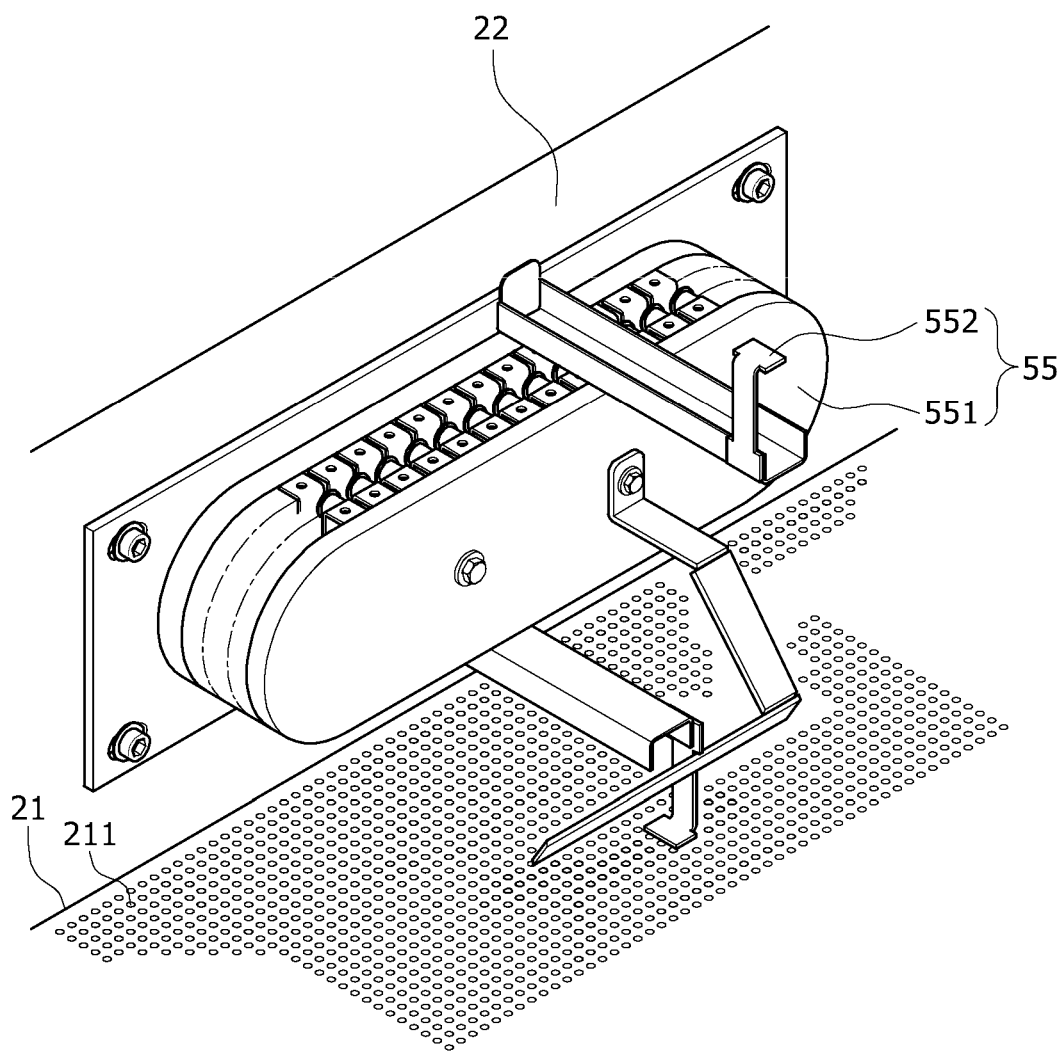
FIG. 8 is a schematic view illustrating a central pressing part of a third folding part in the spring roll making apparatus according to the embodiment of the present invention.
Figure 9:
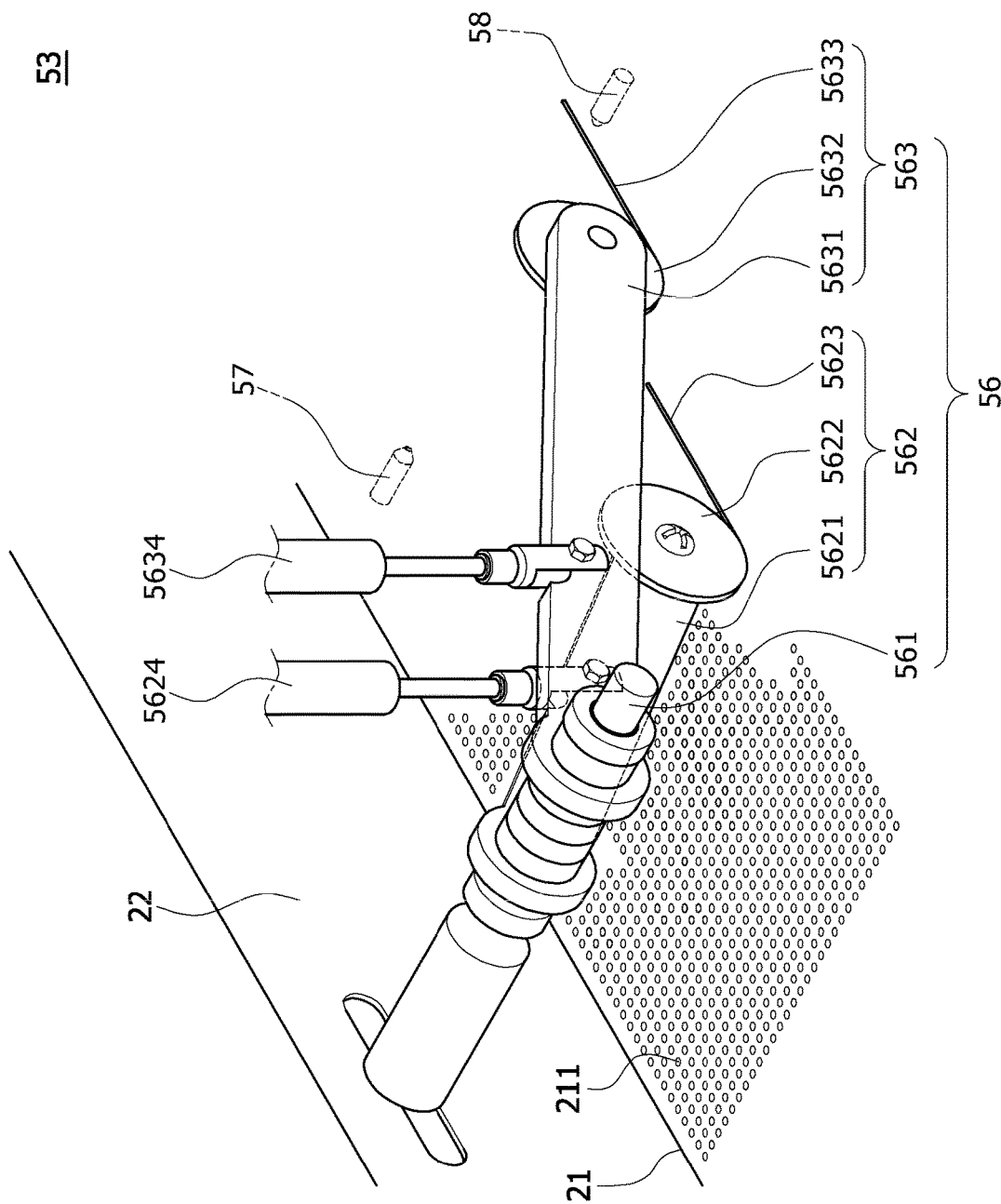
FIG. 9 is a schematic view illustrating a left-and-right pressing part of the third folding part in the spring roll making apparatus according to the embodiment of the present invention.

FIG. 8 is a schematic view illustrating a central pressing part of the third folding part in the spring roll making apparatus according to the embodiment of the present invention, and FIG. 9 is a schematic view illustrating a left-and-right pressing part of the third folding part in the spring roll making apparatus according to the embodiment of the present invention. Referring to FIGS. 8 and 9, the third folding part 53 according to the embodiment of the present invention includes a third central pressing part 55, a third left-and-right pressing part 56, a third left spray part 57, and a third right spray part 58.

The third central pressing part 55 presses the filling 200 wrapped in the rice paper 100. For example, the rice paper 100 may be continuously moved by the moving part 20, and the third central pressing part 55 may temporarily press the filling 200 moved by the moving part 20 and the rice paper 100 wrapped around the filling 200 to restrict left-and-right movement of the rice paper 100.

The third left-and-right pressing part 56 presses a left wing and a right wing of the rice paper 100 alternately. The third left spray part 57 sprays air onto a left end part of the rice paper 100, and the third right spray part 58 sprays air onto a right end part of the rice paper 100.

For example, when the moving rice paper 100 is viewed from above the rice paper 100, in a state in which the third left-and-right pressing part 56 presses the rice paper 100 placed on the left end part of the filling 200, the third left spray part 57 may spray air onto the left end part of the rice paper 100 so that the left wing of the rice paper 100 may be folded. In addition, in a state in which the third left-and-right pressing part 56 presses the rice paper 100 placed on the right end part of the filling 200, the third right spray part 58 may spray air onto the right end part of the rice paper 100 so that the right wing of the rice paper 100 may be folded. In this case, the third left-and-right pressing part 56 may press the boundary lines formed on the rice paper 100 by the second rotating plates 523.

The third central pressing part 55 according to the embodiment of the present invention includes a third pressing driver 551 and a third pressing contact part 552.

The third pressing driver 551 is disposed above the rice paper 100 and moved in a traveling direction of the rice paper 100. The third pressing contact part 552 is mounted on the third pressing driver 551 and presses the filling 200 wrapped in the rice paper 100 while being moved in the traveling direction of the rice paper 100.

For example, the third pressing driver 551 may be mounted on the movement fixing part 22 and disposed above the belt part 21. The third pressing driver 551 may move the third pressing contact part 552 in a caterpillar manner. In this case, one or more third pressing contact parts 552 may be mounted on the third pressing driver 551.

The third left-and-right pressing part 56 according to the embodiment of the present invention includes a left-and-right support part 561, a left pressing part 562, and a right pressing part 563. In this case, an end part of the right pressing part 563 is disposed in front of the left pressing part 562 to perform sequential operations.

The left-and-right support part 561 is disposed above the rice paper 100. For example, the left-and-right support part 561 may be mounted on the movement fixing part 22 and disposed above the belt part 21. The left-and-right support part 561 may be disposed behind the third pressing driver 551 based on the traveling direction of the rice paper 100.

The left pressing part 562 is rotatably mounted on the left-and-right support part 561 and presses the left end part of the rice paper 100. For example, the left pressing part 562 may include a left rod 5621 which is rotatably provided on the left-and-right support part 561, a left rotating part 5622 which is rotatably mounted on a lower end part of the left rod 5621 and is brought into contact with the belt part 21, and a left contact part 5623 which extends in the traveling direction of the rice paper 100 from the lower end part of the left rod 5621 and is brought into contact with the rice paper 100.

Meanwhile, a left variable part 5624 mounted on the movement fixing part 22 may be coupled to the left rod 5621, and a length thereof may be varied to rotate the left rod 5621. That is, when the sensor part 70 detects the rice paper 100, the length of the left variable part 5624 may be increased and thus the left rotating part 5622 disposed above the belt part 21 may be brought into contact with the belt part 21.

The right pressing part 563 is rotatably mounted on the left-and-right support part 561 and presses the right end part of the rice paper 100. For example, the right pressing part 563 may include a right rod 5631 which is rotatably provided on the left-and-right support part 561, a right rotating part 5632 which is rotatably mounted on a lower end part of the right rod 5631 and is brought into contact with the belt part 21, and a right contact part 5633 which extends in the traveling direction of the rice paper 100 from the lower end part of the right rod 5631 and is brought into contact with the rice paper 100.

Meanwhile, a right variable part 5634 mounted on the movement fixing part 22 may be coupled to the right rod 5631, and a length thereof may be varied to rotate the right rod 5631. That is, when the sensor part 70 detects the rice paper 100, the length of the right variable part 5634 may be increased and thus the right rotating part 5632 disposed above the belt part 21 may be brought into contact with the belt part 21.

Figure 10:
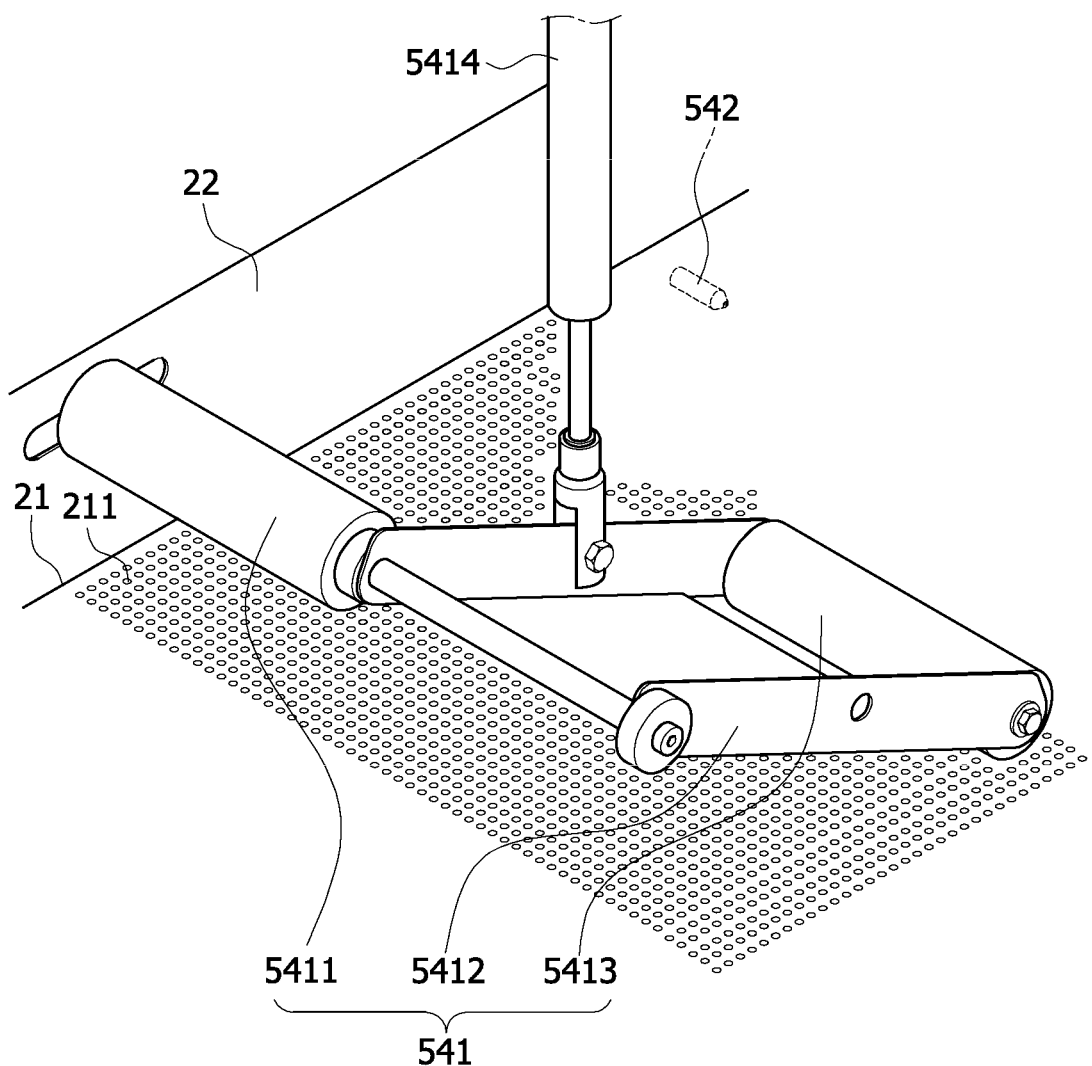
FIG. 10 is a schematic view illustrating a fourth folding part in the spring roll making apparatus according to the embodiment of the present invention.

FIG. 10 is a schematic view illustrating the fourth folding part in the spring roll making apparatus according to the embodiment of the present invention. Referring to FIG. 10, the fourth folding part 54 according to the embodiment of the present invention includes a fourth pressing part 541 and a fourth spray part 542.

The fourth pressing part 541 presses the end part of the rice paper 100. The fourth pressing part 541 may press the rear end part of the rice paper 100 moved by the moving part 20 to restrict the movement of the rice paper 100.

The fourth pressing part 541 according to the embodiment of the present invention may include a fourth pressing support part 5411, fourth pressing rods 5412, and a fourth pressing contact part 5413.

The fourth pressing support part 5411 is disposed above the rice paper 100. For example, the fourth pressing support part 5411 may be mounted on the movement fixing part 22 and disposed above the belt part 21.

The fourth pressing rods 5412 are rotatably mounted on the fourth pressing support part 5411. For example, a pair of the fourth pressing rods 5412 may be mounted on the fourth pressing support part 5411.

The fourth pressing contact part 5413 is rotatably mounted on an end part of the fourth pressing rod 5412 and is brought into contact with the belt part 21 or with the rear end part of the rice paper 100 that is mounted on the belt part 21 and moved.

Meanwhile, a fourth pressing variable part 5414 mounted on the movement fixing part 22 may be coupled to the fourth pressing rod 5412, and a length thereof may be varied to rotate the fourth pressing rod 5412. That is, when the sensor part 70 detects the rice paper 100, the length of the fourth pressing variable part 5414 may be increased and thus the fourth pressing contact part 5413 disposed above the belt part 21 may be brought into contact with the belt part 21.

The fourth spray part 542 sprays air onto the rice paper 100 to fold the side end part of the rice paper 100. For example, in a state in which the fourth pressing part 541 presses the rear end part of the rice paper 100, the fourth spray part 542 sprays air onto the rice paper 100 and thus the rice paper 100 may be prevented from protruding greater than the length of the filling 200.

Figure 11:
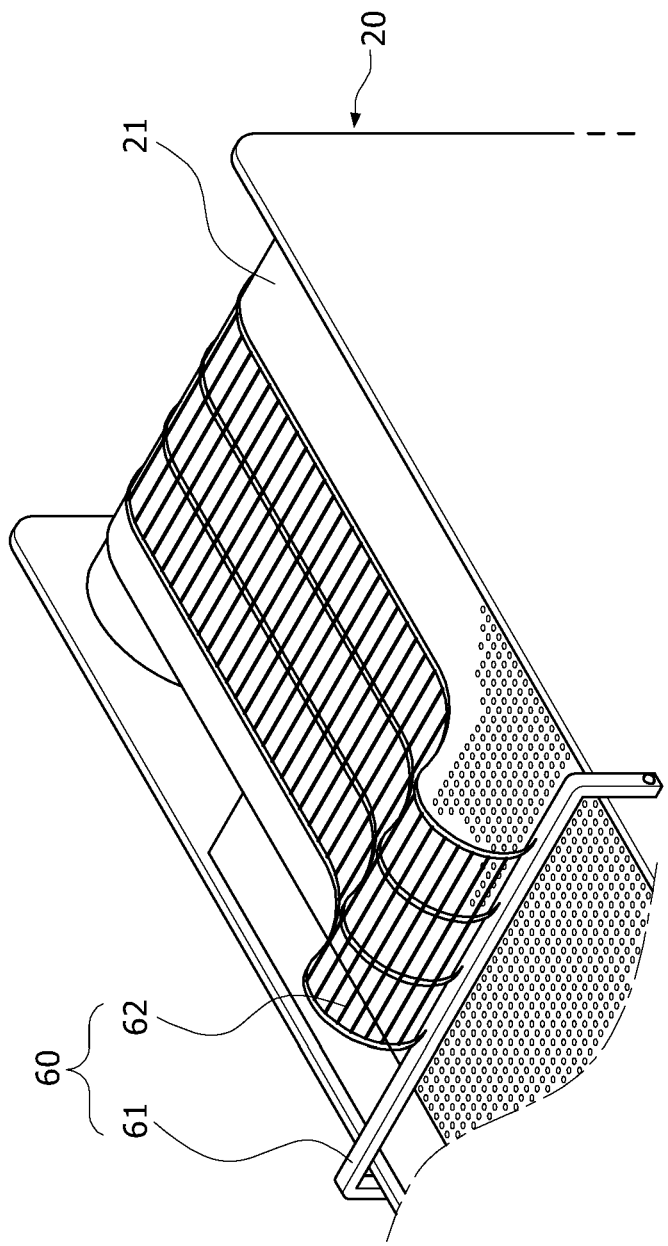
FIG. 11 is a schematic view illustrating a rotating part in the spring roll making apparatus according to the embodiment of the present invention.

FIG. 11 is a schematic view illustrating the rotating part in the spring roll making apparatus according to the embodiment of the present invention. Referring to FIG. 11, the rotating part 60 according to the embodiment of the present invention includes a rotation support part 61 and a rotation guide part 62.

The rotation support part 61 is mounted on the moving part 20 and disposed above the rice paper 100. For example, the rotation support part 61 may be disposed above the belt part 21 and may allow the rice paper 100 wrapped around the filling 200 to pass therethrough.

The rotation guide part 62 is mounted on the rotation support part 61, has a length extending in the traveling direction of the rice paper 100, and allows the moving rice paper 100 to be caught and rolled. For example, the rotation guide part 62 may have one end part mounted on the rotation support part 61 and the other end part in contact with the belt part 21. In addition, the rice paper 100 in contact with the rotation guide part 62 may be rotated while being moved in the traveling direction of the belt part 21 due to a moving force by the belt part 21.

Figure 12:
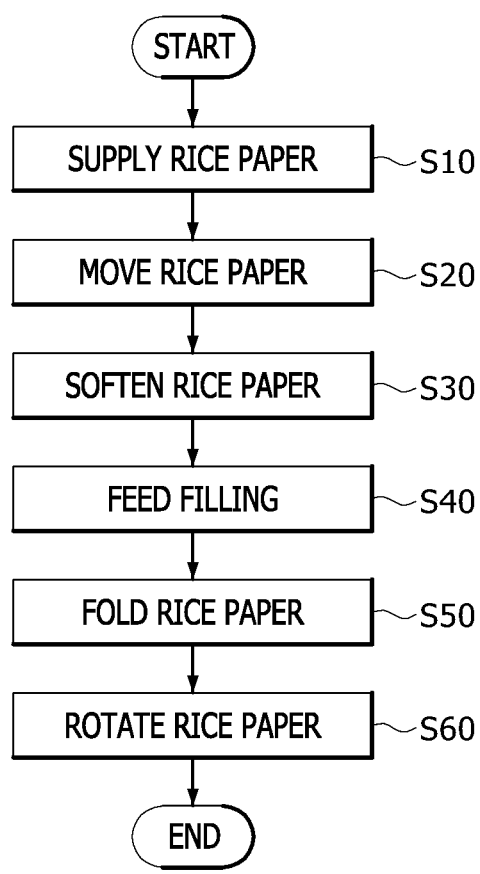
FIG. 12 is a schematic flowchart illustrating a spring roll making method according to an embodiment of the present invention.

FIG. 12 is a schematic flowchart illustrating a spring roll making method according to an embodiment of the present invention. The spring roll making method will be described with reference to FIG. 12 as follows.

A supply part 10 supplies rice papers 100 (S10), and a moving part 20 moves the rice papers 100 (S20). That is, the supply part 10 automatically supplies the dried rice papers 100, and the supplied rice papers 100 having a tetragonal shape is moved by the moving part 20. In this case, the rice paper 100 may be moved as a rhombus shape so that corners may be formed at front and rear end parts of the rice paper 100.

The rice paper 100 moved by the supply part 10 and the moving part 20 is softened by a softening part 30 (S30). When the softening of the rice paper 100 is completed, a feeding part 40 feeds a filling 200 onto the rice paper 100 (S40).

The rice paper 100 on which the filling 200 is placed is continuously moved by the moving part 20 and is folded by a folding part 50 (S50). The rice paper 100 folded by the folding part 50 is wrapped around the filling 200 while being rotated by a rotating part 60 (S60).

That is, the rice paper 100 may be wrapped around the filling 200 so as to correspond to a length of the filling 200 while passing through the folding part 50 and the rotating part 60 in sequence by the moving part 20.

Figure 13:
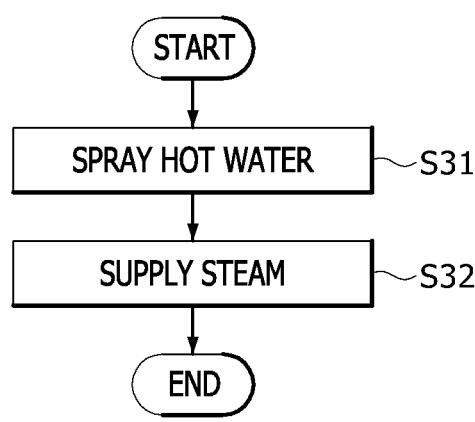
FIG. 13 is a schematic flowchart illustrating a process of operating a softening part in the spring roll making method according to the embodiment of the present invention.

FIG. 13 is a schematic flowchart illustrating a process of operating the softening part in the spring roll making method according to the embodiment of the present invention. To describe an operation of the softening part 30 with reference to FIG. 13, first, a softening spray part 31 sprays hot water onto the rice paper 100 (S31), and a softening steam part 32 supplies steam onto the rice paper 100 (S32).

Figure 14:
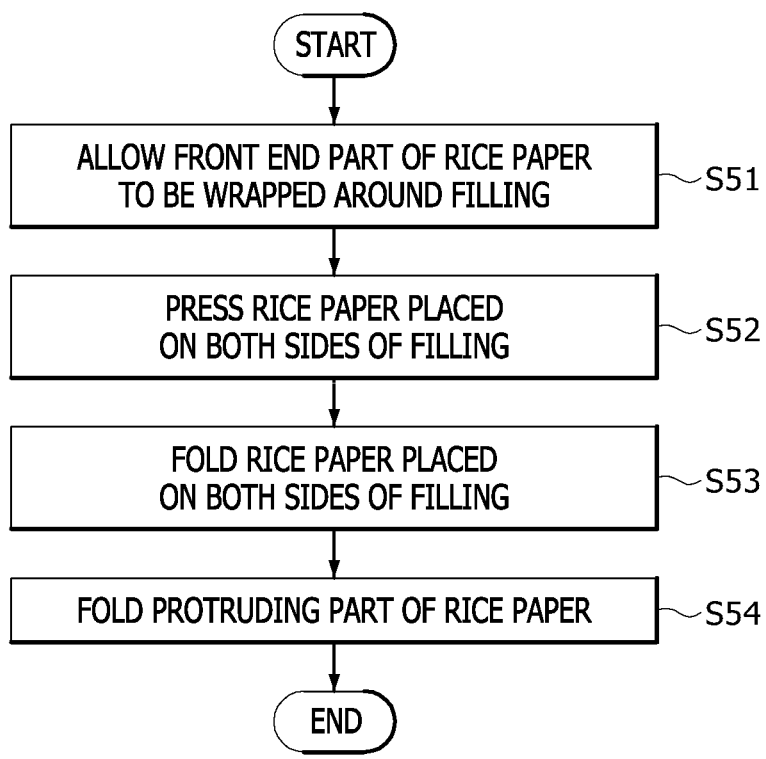
FIG. 14 is a schematic flowchart illustrating a process of operating a folding part in the spring roll making method according to the embodiment of the present invention.

FIG. 14 is a schematic flowchart illustrating a process of operating the folding part in the spring roll making method according to the embodiment of the present invention. To describe an operation of the folding part 50 with reference to FIG. 14, a first folding part 51, a second folding part 52, a third folding part 53, and a fourth folding part 54 are sequentially disposed in a traveling direction of the rice paper 100 moved by the moving part 20 to fold the rice paper 100.

That is, the first folding part 51 allows a front end part of the rice paper 100 to be wrapped around the filling 200 (S51), and the second folding part 52 presses the rice paper 100 placed on both sides of the filling 200 (S52).

The third folding part 53 folds the rice paper 100 placed on the both sides of the filling 200 (S53), and the fourth folding part 54 folds a protruding part of the rice paper 100 (S54).

Figure 15:
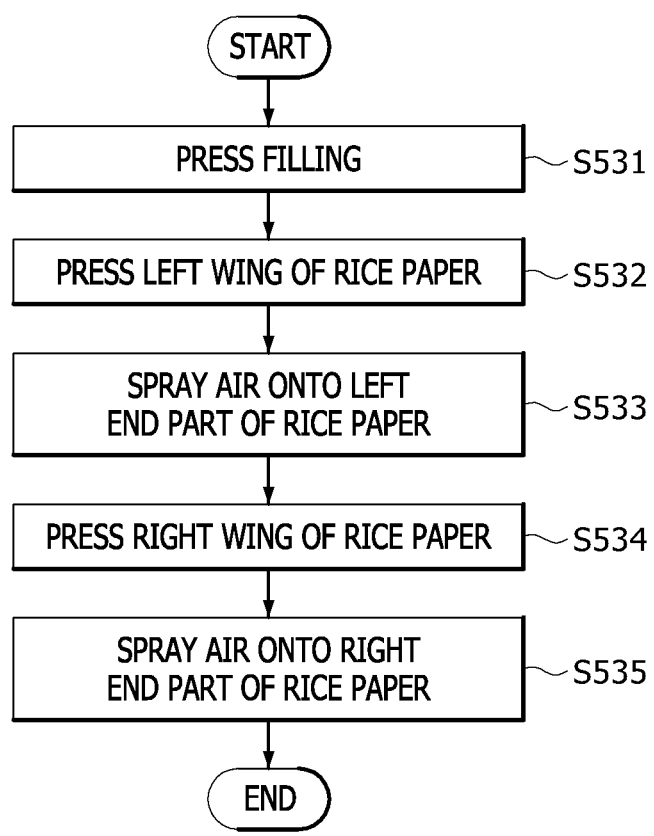
FIG. 15 is a schematic flowchart illustrating a process of operating a third folding part in the spring roll making method according to the embodiment of the present invention.

FIG. 15 is a schematic flowchart illustrating a process of operating the third folding part in the spring roll making method according to the embodiment of the present invention. To describe an operation of the third folding part 53 with reference to FIG. 15, a third central pressing part 55 presses the filling 200 wrapped in the moving rice paper 100 to restrict movement of the filling 200 (S531).

While the third central pressing part 55 continuously presses the moving filling 200, a third left-and-right pressing part 56 presses a left wing of the rice paper 100 (S532), and a third left spray part 57 sprays air onto a left end part of the rice paper 100 so that a left end part of the rice paper 100 overlaps above the filling 200 (S533).

When the operation of the third left spray part 57 is completed, the third left-and-right pressing part 56 presses a right wing of the rice paper 100 (S534), and the third right spray part 58 sprays air onto a right end part of the rice paper 100 so that a right end part of the rice paper 100 overlaps above the filling 200 (S535).

Figure 16:
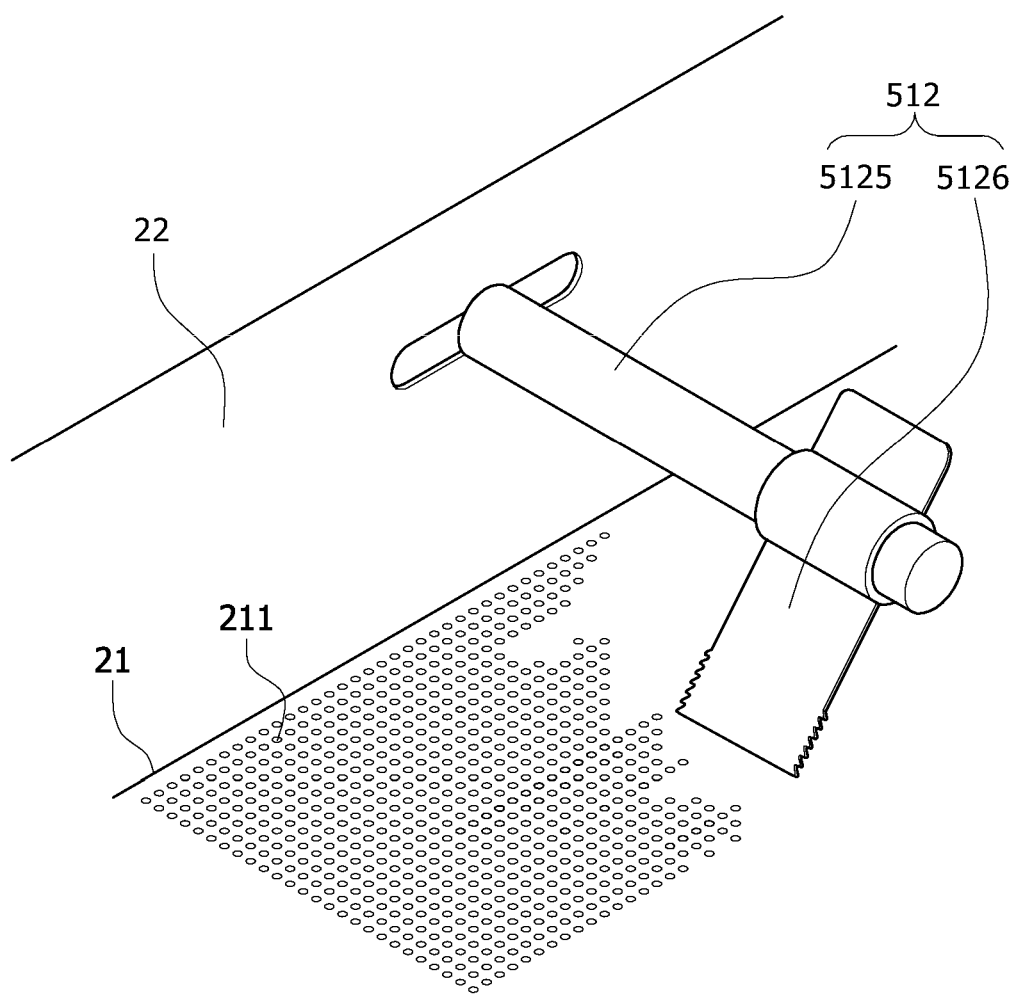
FIG. 16 is a schematic view illustrating another example of the first folding part.

Meanwhile, FIG. 16 is a schematic view illustrating another example of the first folding part. Referring to FIG. 16, a first engaging part 512 may include a first engaging rod 5125 and a first engaging guide part 5126. The first engaging rod 5125 may be fixedly provided on the moving part 20, and the first engaging guide part 5126 may be rotatably mounted on the first engaging rod 5125. A lower end part of the first engaging guide part 5126 may be brought into contact with the rice paper 100 wrapped around the filling 200, and an upper end part of the first engaging guide part 5126 may be disposed above the first engaging rod 5125. The first engaging guide part 5126 may be rotated when being brought into contact with the rice paper 100 and may return to an original position thereof when an external force is removed. In this case, when a separate tension spring is applied, the first engaging guide part 5126 may rapidly return to the original position thereof.

Figure 17:
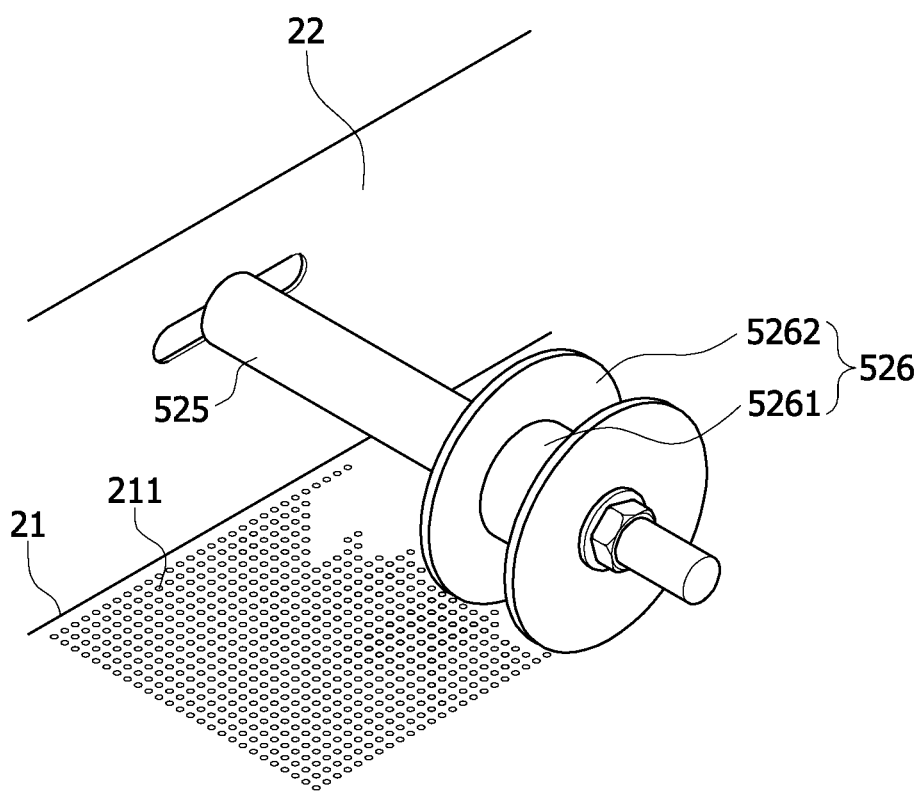
FIG. 17 is a schematic view illustrating another example of the second folding part.

FIG. 17 is a schematic view illustrating another example of the second folding part. Referring to FIG. 17, a second folding part 52 may include a second motor driver 525 and a second motor rotating part 526. The second motor driver 525 may be mounted on the movement fixing part 22 and disposed above the belt part 21. When power is applied, the second motor driver 525 may be driven to rotate a motor shaft. The second motor rotating part 526 may be coupled to the motor shaft of the second motor driver 525 and may be rotated when the second motor driver 525 is driven. The second motor rotating part 526 may include a second motor rotation shaft 5261, which is coupled to the motor shaft of the second motor driver 525, and second motor rotation contact parts 5262 which are formed on the second motor rotation shaft 5261 and provided in a pair to face each other. The second motor rotation contact parts 5262 may be rotated while being in contact with the belt part 21, and a distance between the second motor rotation contact parts 5262 may be greater than the length of the filling 200 so that the second motor rotation contact parts 5262 may press the rice paper 100, and thus boundary lines for folding may be formed.

Figure 18:
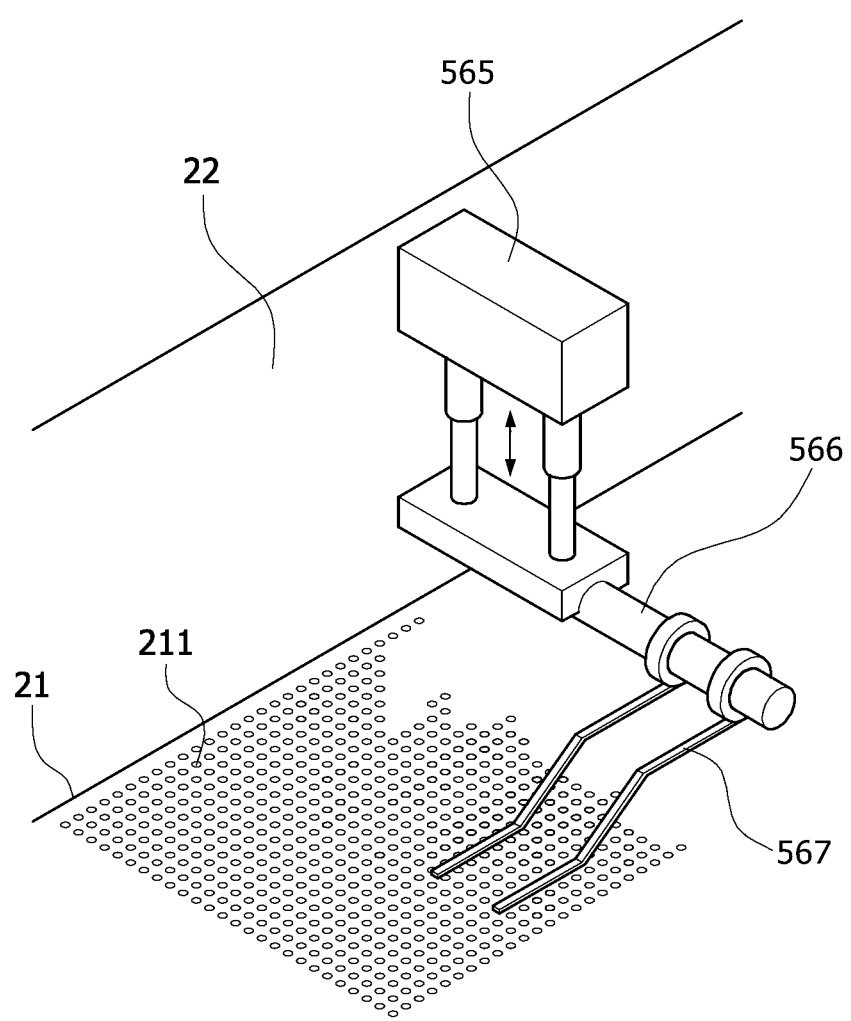
FIG. 18 is a schematic view illustrating another example of the third folding part.

FIG. 18 is a schematic view illustrating another example of the third folding part. Referring to FIG. 18, a third left-and-right pressing part 56 may include a third left-and-right operation part 565, a third left-and-right rod 566, and third left-and-right pressing parts 567. The third left-and-right operation part 565 may be mounted on the movement fixing part 22, and a length of a piston may be changed according to hydraulic pressure or pneumatic pressure so that a height of the third left-and-right rod 566 may be adjusted. A pair of the third left-and-right pressing parts 567 may be mounted on the third left-and-right rod 566. When the sensor part 70 detects the rice paper 100 in the above state, a length of the third left-and-right operation part 565 may be increased, the third left-and-right pressing part 567 may be moved downward to press each of left-and-right wing parts of the rice paper 100 moved on the belt part 21, and a third left spray part 57 and a third right spray part 58 sequentially spray air so that the left and right wings of the rice paper 100 may be folded.

Figure 19:
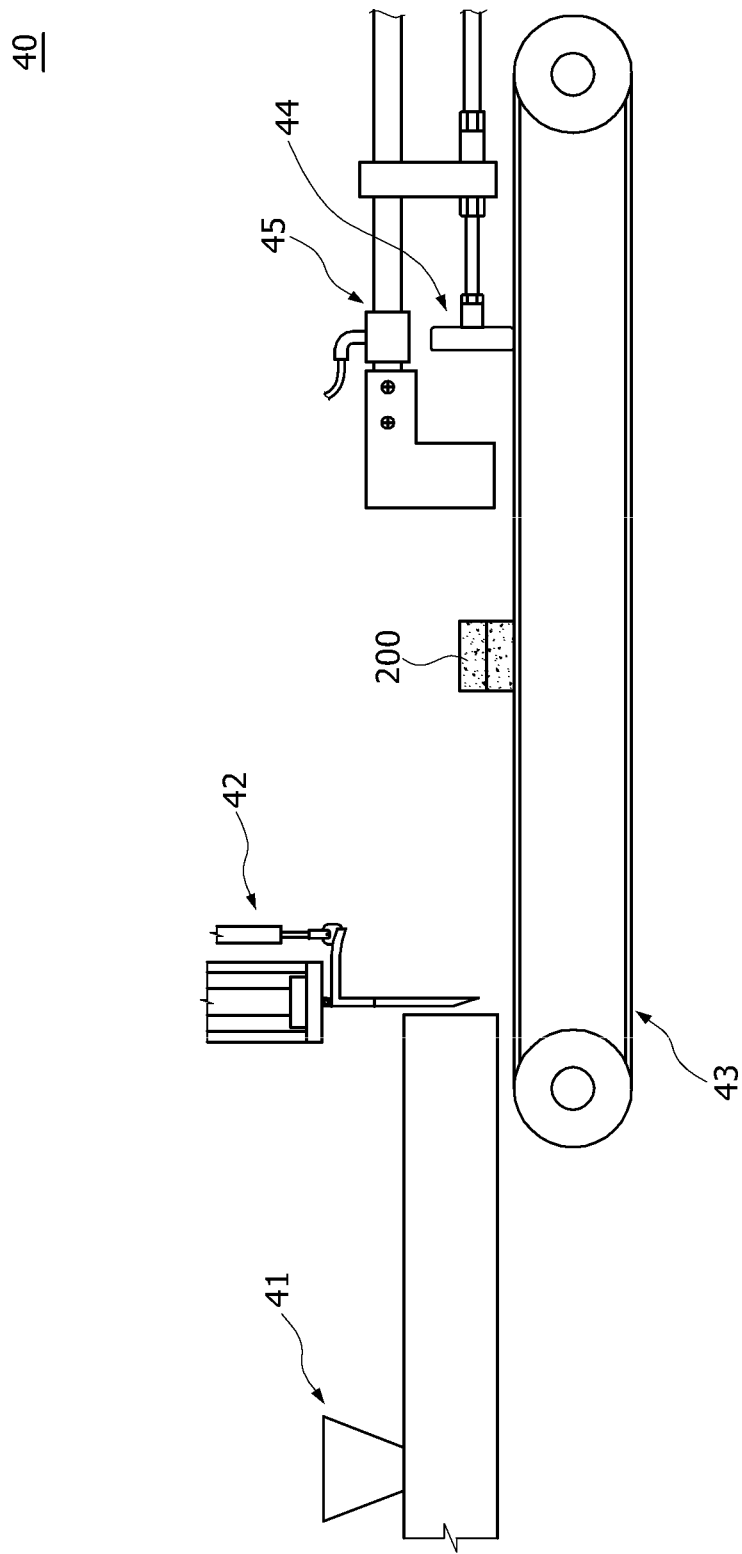
FIG. 19 is a schematic view illustrating a feeding part in the spring roll making apparatus according to the embodiment of the present invention.

FIG. 19 is a schematic view illustrating the feeding part in the spring roll making apparatus according to the embodiment of the present invention. Referring to FIG. 19, the feeding part 40 includes a feed supply part 41 and a feed cutting part 42 and cuts to subdivide the filling 200. In addition, the feeding part 40 may further include a feed belt part 43, a feed stopper 44, and a feed dropping part 45 and may allow the subdivided fillings 200 to be sequentially dropped onto the moving rice paper 100.

The feed supply part 41 may supply the filling 200, the feed cutting part 42 may cut the filling 200 provided from the feed supply part 41, the feed belt part 43 may guide the cut and subdivided fillings 200, the feed stopper 44 may temporarily stop movement of the filling 200 being moved by the feed belt part 43, and the feed dropping part 45 may drop the filling 200 of which the movement is stopped by the feed stopper 44 from the feed belt part 43.

Figure 20:
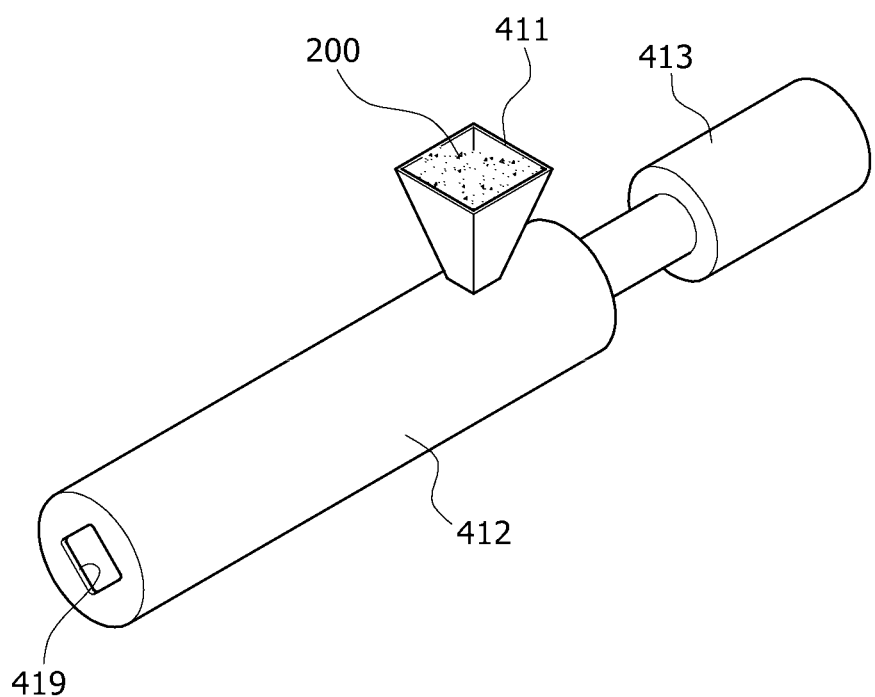
FIG. 20 is a schematic view illustrating a feed supply part in the spring roll making apparatus according to the embodiment of the present invention.

FIG. 20 is a schematic view illustrating the feed supply part in the spring roll making apparatus according to the embodiment of the present invention. Referring to FIG. 20, the feed supply part 41 according to the embodiment of the present invention includes a supply inlet part 411, a supply guide part 412, and a supply operation part 413.

The supply guide part 412 guides the filling 200 introduced into the supply inlet part 411, and the supply operation part 413 allows the filling 200 introduced into the supply guide part 412 to be provided to an end part of the supply guide part 412.

For example, the supply inlet part 411 may have a hopper shape that communicates with one end part of the supply guide part 412, and an operator feeds the filling 200 into the supply inlet part 411. In addition, the supply guide part 412 may have a cylindrical shape, and the supply operation part 413 may be inserted into the supply guide part 412 to move the filling 200. In this case, the supply operation part 413 may move the filling 200 in one direction while a rod having a spiral shape is rotated or may move the filling 200 through a change in the length of the piston.

A guide hole 419 formed in the end part of the supply guide part 412 has an angular shape so that the filling 200 is provided in the angular shape. That is, in order to suppress the rotation of the filling 200 dropped on the rice paper 100, the filling 200 may pass through the guide hole 419 having the angular shape. In this case, the guide hole 419 may have a triangular or tetragonal hole shape.

Figure 21:
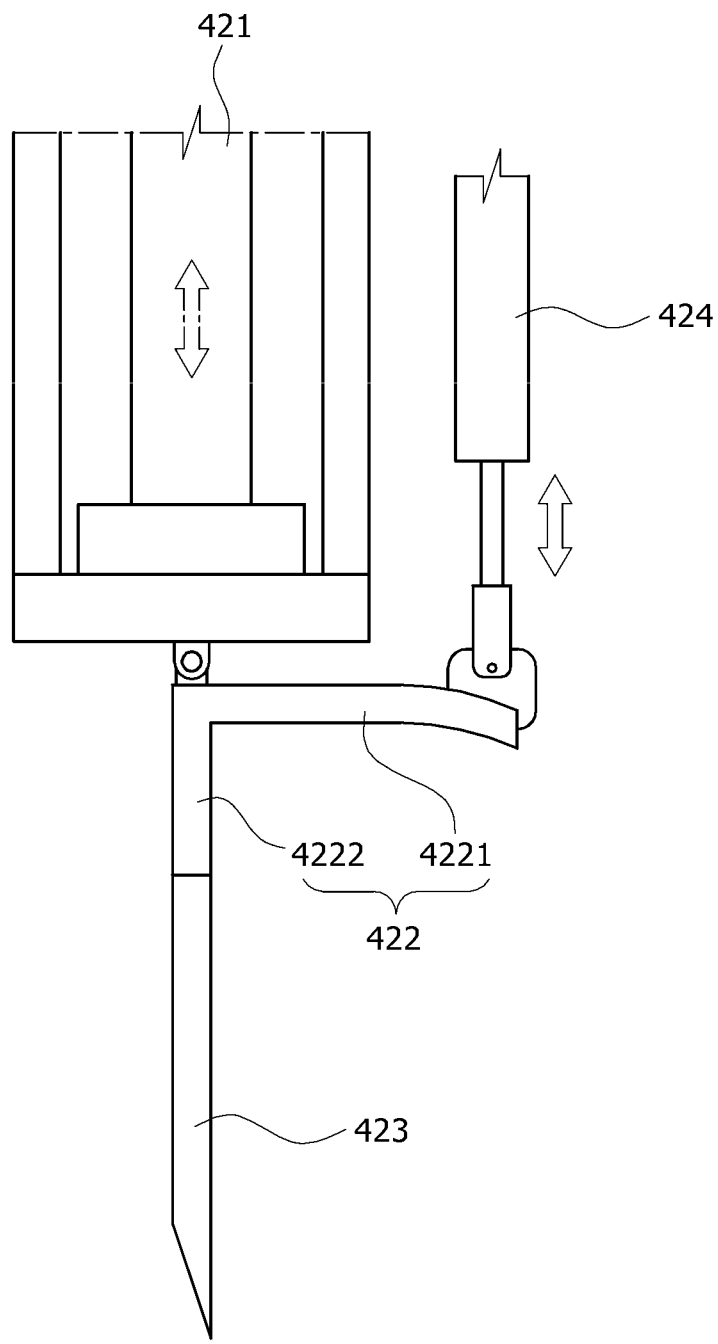
FIG. 21 is a schematic view illustrating a feed cutting part in the spring roll making apparatus according to the embodiment of the present invention.

FIG. 21 is a schematic view illustrating the feed cutting part in the spring roll making apparatus according to the embodiment of the present invention. Referring to FIG. 21, the feed cutting part 42 according to the embodiment of the present invention includes a cutting driver 421, a cutting link part 422, a cutting blade part 423, and a cutting rotation part 424.

A vertical length of the cutting driver 421 may be varied. For example, the cutting driver 421 may be fixedly provided on the supply guide part 412 or a separate fixture, and a length of the cutting driver 421 may be adjusted by moving a piston up and down according to hydraulic pressure or pneumatic pressure.

The cutting link part 422 is rotatably mounted on the cutting driver 421 and has a height adjusted according to the length of the cutting driver 421. For example, the cutting link part 422 may include a link horizontal part 4221 having a horizontal length and rotatably mounted on the cutting driver 421 to adjust a height thereof, and a link vertical part 4222 extending downward from one end part of the link horizontal part 4221.

The cutting blade part 423 is formed on the cutting link part 422 and cuts the filling 200. For example, the cutting blade part 423 may have a plate shape that covers the guide hole 419 and may be mounted on the link vertical part 4222.

The cutting rotation part 424 is connected to the cutting link part 422, and a length thereof is varied to rotate the cutting link part 422. For example, the cutting rotation part 424 may be mounted on the supply guide part 412 or a separate fixture, and the length of the cutting rotation part 424 may be adjusted by moving the piston up and down according to hydraulic pressure or pneumatic pressure. The cutting rotation part 424 may be connected to the other end part of the link horizontal part 4221.

Figure 22:
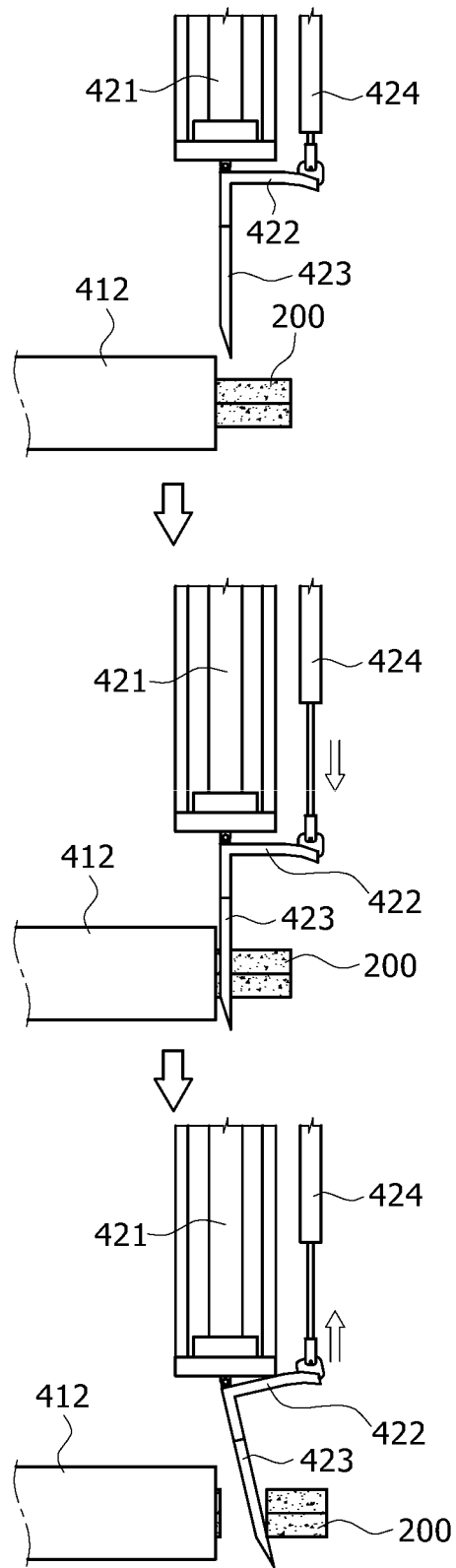
FIG. 22 is a schematic view illustrating a process of cutting a filling in the spring roll making apparatus according to the embodiment of the present invention.

FIG. 22 is a schematic view illustrating a process of cutting the filling in the spring roll making apparatus according to the embodiment of the present invention. A schematic description of the process of cutting the filling 200 will be described with reference to FIG. 22 as follows.

When the filling 200 is provided from the feed supply part 41, the length of the cutting driver 421 is increased so that the cutting link part 422 is moved downward. When the cutting link part 422 is moved downward, the cutting blade part 423 cuts the filling 200 provided continuously. In this case, the length of the cutting rotation part 424 is increased to be the same as the length of the cutting driver 421 so that the cutting link part 422 may be moved linearly downward.

Meanwhile, when the cutting blade part 423 cuts the filling 200, the length of the cutting rotation part 424 is reduced. As a result, while the other end part of the cutting link part 422 is lifted upward, one end part of the cutting link part 422 is rotated. In addition, the cutting blade part 423 mounted on the cutting link part 422 may be moved to take the cut filling 200 out and thus may additionally cut or separate tendons and the like included in the filling 200.

Figure 23:
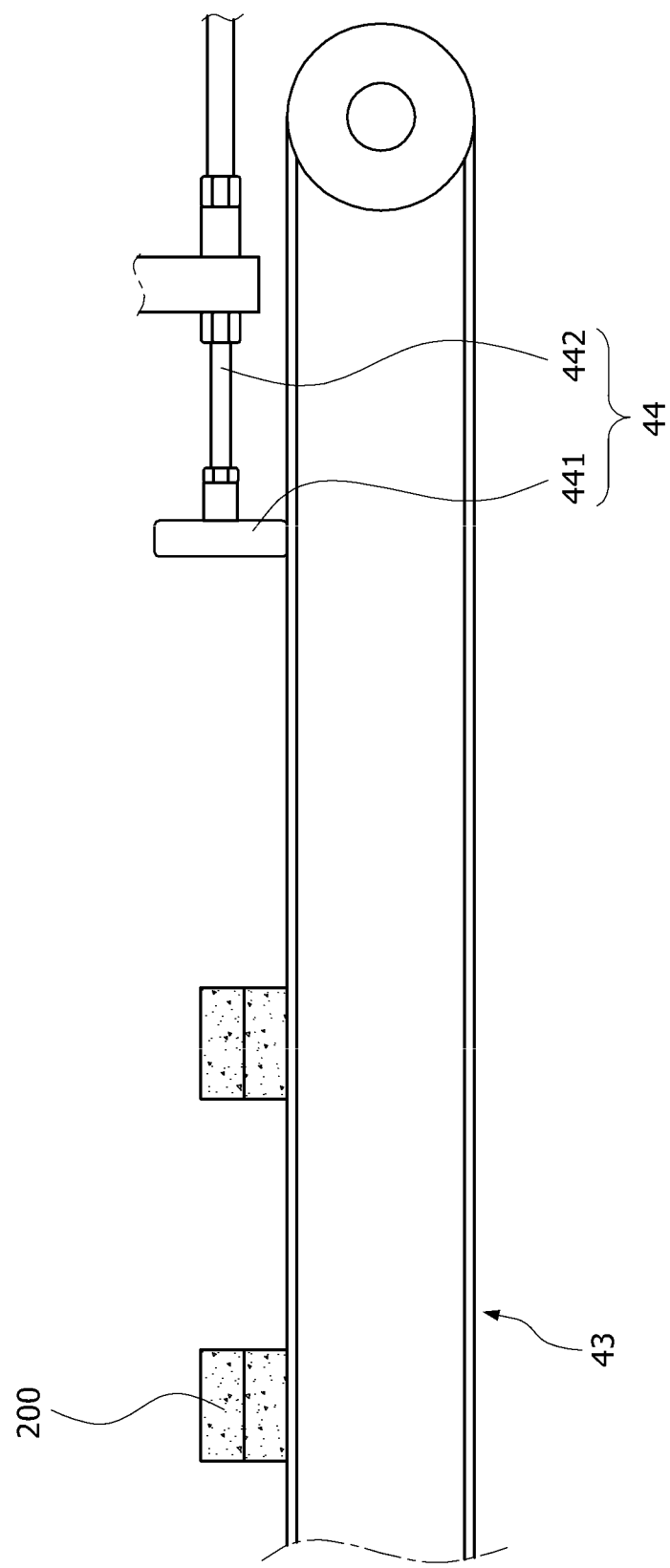
FIG. 23 is a schematic view illustrating a feed stopper in the spring roll making apparatus according to the embodiment of the present invention.

FIG. 23 is a schematic view illustrating the feed stopper in the spring roll making apparatus according to the embodiment of the present invention. Referring to FIG. 23, the feed stopper 44 according to the embodiment of the present invention includes a stopper head 441 and a stopper variable part 442.

The stopper head 441 is brought into contact with the filling 200. For example, the feed belt part 43 that allows the filling 200 to be moved in a belt conveyor method may guide the filling 200 that is cut and dropped by the feed cutting part 42, and the stopper head 441 may be disposed above the feed belt part 43. In this case, the feed belt part 43 may cross the moving part 20, and the movement of the filling 200 may be restricted by the stopper head 441 disposed in the movement path of the filling 200. The stopper head 441 may be covered with a replaceable sanitary cover.

The stopper variable part 442 is connected to the stopper head 441, and a length is varied to move the stopper head 441. For example, the stopper variable part 442 may have a length in a longitudinal direction of the feed belt part 43, and the length of the stopper variable part 442 may be adjusted by pneumatic pressure or hydraulic pressure to move the stopper head 441.

When the feed dropping part 45 pushes the filling 200 stopped by the stopper head 441, the stopper variable part 442 moves the stopper head 441 so that the stopper head 441 is spaced apart from the filling 200.

That is, when the feed dropping part 45 is operated while the filling 200 is attached to the stopper head 441, the filling 200 may not be smoothly separated from the stopper head 441 due to the moisture contained in the filling so that the filling 200 may not be dropped in a set state.

Therefore, when the feed dropping part 45 pushes the filling 200, the stopper head 441 may be spaced apart from the filling 200, and thus the filling 200 may be dropped in the set state and be placed on the rice paper 100 moved by the moving part 20.

Figure 24:
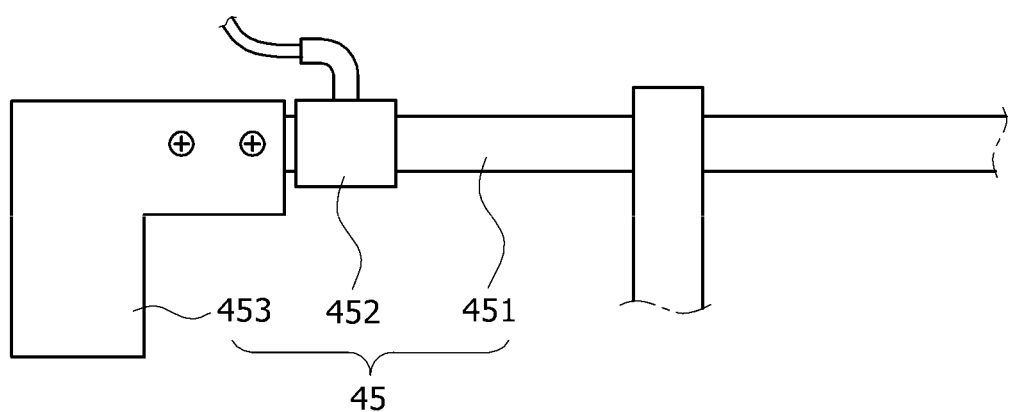
FIG. 24 is a schematic view illustrating a feed dropping part in the spring roll making apparatus according to the embodiment of the present invention.

FIG. 24 is a schematic view illustrating the feed dropping part in the spring roll making apparatus according to the embodiment of the present invention. Referring to FIG. 24, the feed dropping part 45 according to the embodiment of the present invention includes a drop rod 451, a drop operation part 452, and a drop plate 453.

The drop rod 451 is disposed above the feed stopper 44. For example, the drop rod 451 may have a length in a longitudinal direction of the feed belt part 43, and the drop operation part 452 may be mounted on the drop rod 451.

The drop operation part 452 is mounted on the drop rod 451, and the drop plate 453 connected to the drop operation part 452 pushes the filling 200 placed on the feed belt part 43 while being rotated by the drop operation part 452. As a result, the filling 200 dropped from the feed belt part 43 may be placed on the moving part 20.

For example, the drop operation part 452 may be a motor mounted on the drop rod 451, and the drop plate 453 connected to a rotation shaft of the drop operation part 452 may be rotated by the drop operation part 452 to push the filling 200. In addition, the drop operation part 452 may be a cylinder having a variable length and mounted on the drop rod 451, and the drop plate 453 connected to the drop operation part 452 may be rotatably coupled to the drop rod 451 and may rotate according to a change in length of the drop operation part 452 to push the filling 200. Meanwhile, various driving bodies that rotate the drop plate 453 in one direction and return to an original state may be applied as the drop operation part 452.

Figure 25:
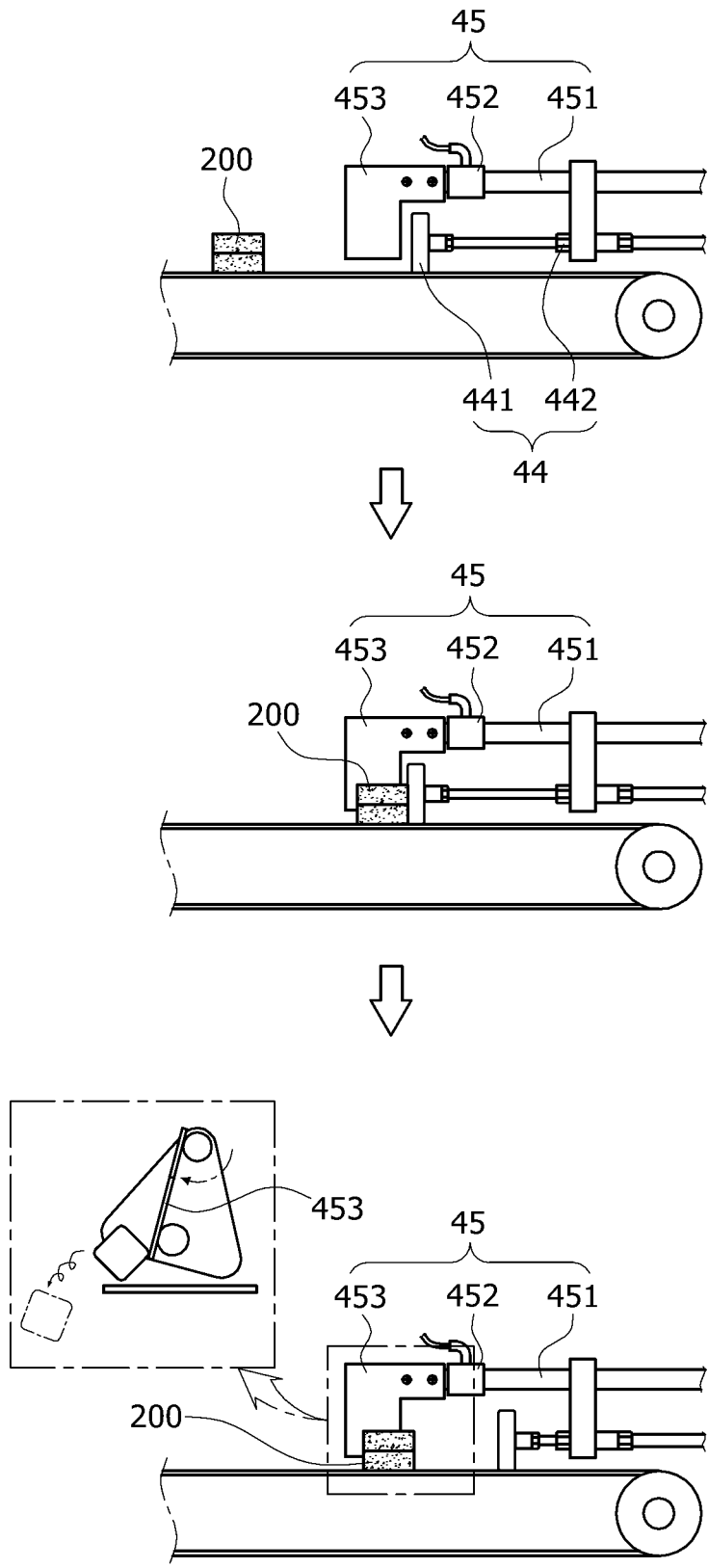
FIG. 25 is a schematic view illustrating a process of dropping a filling in the spring roll making apparatus according to the embodiment of the present invention.

FIG. 25 is a schematic view illustrating a process of dropping the filling in the spring roll making apparatus according to the embodiment of the present invention. The process of dropping the filling 200 will be schematically described with reference to FIG. 25 as follows.

When the subdivided filling 200 reaches the feed belt part 43, the filling 200 is moved in the longitudinal direction of the feed belt part 43. The filling 200 that is moved in the longitudinal direction of the feed belt part 43 is brought into contact with the stopper head 441 so that the movement of the filling 200 is restricted.

When the filling 200 reaches the stopper head 441, the drop operation part 452 is driven so that the drop plate 453 is rotated. When the drop plate 453 is rotated, the filling 200 placed on the feed belt part 43 is pushed out to be dropped to the moving part 20 disposed below the feed belt part 43.

In this case, the stopper variable part 442 is driven so that the stopper head 441 is spaced apart from the filling 200, and thus interference between the drop plate 453 and the stopper head 441 may be prevented and deformation of the filling 200 due to a coupling force between the filling 200 and the stopper head 441 may be blocked. The stopper variable part 442 may be driven simultaneously with the drop operation part 452.

While the present invention has been described with reference to the embodiment illustrated in the accompanying drawings, the embodiment should be considered in a descriptive sense only, and it should be understood by those skilled in the art that various alterations and equivalent other embodiments may be made.

Therefore, the scope of the present invention should be defined by only the following claims.

The invention claimed is:
1. A spring roll making apparatus comprising:
   a supply part configured to supply a rice paper;
   a moving part configured to move the rice paper supplied by the supply part;
   a softening part configured to induce softening of the rice paper moved by the moving part;
   a feeding part configured to feed a filling onto the rice paper softened by the softening part;
   a folding part configured to fold the rice paper on which the filling is placed; and
   a rotating part configured to roll the rice paper folded by the folding part,
   wherein the folding part includes:
      a first folding part configured to allow a front end part of the rice paper to be wrapped around the placed filling;
      a second folding part configured to press the rice paper which passes through the first folding part and is placed on both sides of the filling; and
      a third folding part configured to fold the rice paper which passes through the second folding part and is placed on the both sides of the filling,
   wherein the first holding part includes:
      a first spray part configured to spray air onto an end part of the rice paper so that the rice paper is wrapped around the filling; and
      a first engaging part configured to allow the rice paper wrapped around the filling to be caught and rotated more than once.

2. The spring roll making apparatus of claim 1, wherein the softening part includes a softening spray part configured to spray hot water onto the rice paper moved by the moving part.

3. The spring roll making apparatus of claim 2, wherein the softening part further includes a softening steam part configured to supply steam onto the rice paper.

4. The spring roll making apparatus of claim 3, wherein the softening steam part includes:
   a plurality of steam stands;
   a steam tank part supported by the steam stands, covers the moving part, and stores water; and
   a steam heating part mounted on the steam tank part and heats the stored water.

5. The spring roll making apparatus of claim 4, wherein the softening steam part further includes a steam circulation part mounted on the steam tank part and circulates the steam.

6. The spring roll making apparatus of claim 1, wherein the feeding part includes:
   a feed supply part configured to supply the filling; and
   a feed cutting part configured to cut and subdivide the filling provided from the feed supply part.

7. The spring roll making apparatus of claim 6, wherein the feed supply part includes:
   a supply inlet part into which the filling is introduced;
   a supply guide part connected to the supply inlet part and guides the filling; and
   a supply operation part inserted into the supply guide part and provides the filling introduced into the supply guide part to an end part of the supply guide part.

8. The spring roll making apparatus of claim 7, wherein a guide hole formed in the end part of the supply guide part has an angular shape so that the filling is provided in the angular shape.

9. The spring roll making apparatus of claim 6, wherein the feed cutting part includes:
   a cutting driver;
   a cutting link part rotatably mounted on the cutting driver and having a height adjusted according to a movement of the cutting driver;
   a cutting blade part formed on the cutting link part and cuts the filling; and
   a cutting rotation part connected to the cutting link part to rotate the cutting link part.

10. The spring roll making apparatus of claim 6, wherein the feeding part further includes:
   a feed belt part configured to guide the filling that is subdivided;
   a feed stopper configured to stop movement of the filling moved by the feed belt part; and
   a feed dropping part configured to drop the filling whose movement is stopped by the feed stopper from the feed belt part.

11. The spring roll making apparatus of claim 10, wherein the feed stopper includes:

a stopper head brought into contact with the filling; and a stopper variable part connected to the stopper head and a length is varied to move the stopper head.

12. The spring roll making apparatus of claim 11, wherein the stopper variable part moves the stopper head so that the stopper head is spaced apart from the filling when the feed dropping part pushes the filling stopped by the stopper head.

13. The spring roll making apparatus of claim 10, wherein the feed dropping part includes:

a drop rod disposed above the feed stopper;

a drop operation part mounted on the drop rod; and a drop plate connected to the drop operation part and pushes the filling while rotated by the drop operation part.

14. The spring roll making apparatus of claim 1, wherein the first engaging part includes:

a first engaging support part provided on the moving part; and a first engaging contact part rotatably mounted on the first engaging support part and is brought into contact with the rice paper wrapped around the filling.

15. The spring roll making apparatus of claim 1, wherein the second folding part includes:

a second support part;

a second rod rotatably mounted on the second support part; and second rotating plates provided in a pair and rotatably mounted on an end part of the second rod and presses the rice paper placed on the both sides of the filling.

16. The spring roll making apparatus of claim 15, wherein the second folding part further includes a second variable part coupled to the second rod and of which a length is varied to rotate the second rod.

17. The spring roll making apparatus of claim 1, wherein the second folding part includes:

a second motor driver; and a second motor rotating part mounted on the second motor driver and rotated when power is applied to the second motor driver, wherein the second motor rotating part includes:

a second motor rotation shaft coupled to the second motor driver and rotated when the second motor driver is driven; and second motor rotation contact parts formed on the second motor rotation shaft and provided in a pair to face each other.

18. The spring roll making apparatus of claim 1, wherein the rotating part includes:

a rotation support part mounted on the moving part and disposed above the rice paper; and a rotation guide part mounted on the rotation support part, having a length in a traveling direction of the rice paper, and that allows the rice paper to be caught and rolled.

19. A spring roll making apparatus comprising:

a supply part configured to supply a rice paper;

a moving part configured to move the rice paper supplied by the supply part;

a softening part configured to induce softening of the rice paper moved by the moving part;

a feeding part configured to feed a filling onto the rice paper softened by the softening part;

a folding part configured to fold the rice paper on which the filling is placed; and a rotating part configured to roll the rice paper folded by the folding part, wherein the folding part includes:

a first folding part configured to allow a front end part of the rice paper to be wrapped around the placed filling;

a second folding part configured to press the rice paper which passes through the first folding part and is placed on both sides of the filling; and a third folding part configured to fold the rice paper which passes through the second folding part and is placed on the both sides of the filling, wherein the third folding part includes:

a third central pressing part configured to press the filling wrapped in the rice paper;

a third left-and-right pressing part configured to press a left wing and a right wing of the rice paper alternately;

a third left spray part configured to spray air onto a left end part of the rice paper so that the left wing of the rice paper is folded and; and a third right spray part configured to spray air onto a right end part of the rice paper so that the right wing of the rice paper is folded.

20. The spring roll making apparatus of claim 19, wherein the third central pressing part includes:

a third pressing driver disposed above the moving rice paper and moved in a traveling direction of the rice paper; and a third pressing contact part mounted on the third pressing driver and presses the filling wrapped in the rice paper while moved in the traveling direction of the rice paper.

21. The spring roll making apparatus of claim 19, wherein the third left-and-right pressing part includes:

a left-and-right support part disposed above the moving rice paper;

a left pressing part rotatably mounted on the left-and-right support part and presses the left wing of the rice paper; and a right pressing part rotatably mounted on the left-and-right support part and presses the right wing of the rice paper, wherein the right pressing part is disposed in front of the left pressing part.

22. The spring roll making apparatus of claim 19, wherein the third left-and-right pressing part includes:

a third left-and-right operation part disposed above the moving rice paper and a length is varied;

a third left-and-right rod mounted on the third left-and-right operation part and having a height adjusted when the third left-and-right operation part is operated; and a third left-and-right pressing part mounted on the third left-and-right rod and presses the left and right wings of the rice paper.

23. A spring roll making apparatus comprising:

a supply part configured to supply a rice paper;

a moving part configured to move the rice paper supplied by the supply part;

a softening part configured to induce softening of the rice paper moved by the moving part;

a feeding part configured to feed a filling onto the rice paper softened by the softening part;

a folding part configured to fold the rice paper on which the filling is placed; and a rotating part configured to roll the rice paper folded by the folding part, wherein the folding part includes:
- a first folding part configured to allow a front end part of the rice paper to be wrapped around the placed filling;
- a second folding part configured to press the rice paper which passes through the first folding part and is placed on both sides of the filling; and
- a third folding part configured to fold the rice paper which passes through the second folding part and is placed on the both sides of the filling, wherein the folding part further includes a fourth folding part configured to fold a protruding part of the rice paper passing through the third folding part, and wherein the fourth folding part includes:
- a fourth pressing part configured to press an end part of the rice paper; and
- a fourth spray part configured to spray air onto the rice paper so that a side end part of the rice paper is folded.

\* \* \* \* \*